(12) United States Patent
Imafuji et al.

(10) Patent No.: US 8,649,677 B2
(45) Date of Patent: Feb. 11, 2014

(54) EXCHANGEABLE LENS

(71) Applicant: Nikon Corporation, Tokyo (JP)

(72) Inventors: Kazuharu Imafuji, Kawasaki (JP);
Masafumi Oikawa, Mitaka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/622,787

(22) Filed: Sep. 19, 2012

(65) Prior Publication Data

US 2013/0077956 A1      Mar. 28, 2013

Related U.S. Application Data

(60) Provisional application No. 61/564,550, filed on Nov. 29, 2011.

(30) Foreign Application Priority Data

Sep. 20, 2011   (JP) ................................ 2011-205066
Aug. 31, 2012   (JP) ................................ 2012-191005

(51) Int. Cl.
    *G03B 17/00*      (2006.01)
(52) U.S. Cl.
    USPC ........................................................ 396/532
(58) Field of Classification Search
    USPC ........................................................ 396/532
    See application file for complete search history.

(56) References Cited

U.S. PATENT DOCUMENTS

| | | | |
|---|---|---|---|
| 5,065,175 A | 11/1991 | Suzuki et al. | |
| 5,089,834 A | 2/1992 | Nakasa et al. | |
| 6,336,754 B1 | 1/2002 | Sato et al. | |
| 6,341,902 B1 * | 1/2002 | Sato et al. | 396/529 |
| 8,400,722 B2 | 3/2013 | Imafuji et al. | |
| 2009/0269049 A1 * | 10/2009 | Ueda et al. | 396/529 |
| 2010/0091175 A1 | 4/2010 | Shintani et al. | |
| 2011/0317062 A1 * | 12/2011 | Fujino et al. | 348/360 |
| 2012/0063020 A1 | 3/2012 | Imafuji et al. | |
| 2012/0195587 A1 | 8/2012 | Hasuda et al. | |
| 2013/0071102 A1 | 3/2013 | Imafuji et al. | |

(Continued)

FOREIGN PATENT DOCUMENTS

| | | |
|---|---|---|
| JP | A-07-234432 | 9/1995 |
| JP | A-9-211656 | 8/1997 |

(Continued)

OTHER PUBLICATIONS

Japanese Office Action issued in Japanese Application No. 2012-191002 dated Dec. 4, 2012 (w/translation).

(Continued)

*Primary Examiner* — Clayton E LaBalle
*Assistant Examiner* — Dennis Hancock
(74) *Attorney, Agent, or Firm* — Oliff PLC

(57) ABSTRACT

An exchangeable lens includes: a camera lens mount unit; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member. A shape of at least one lens connector terminal among the twelve lens connector terminals is different from a shape of another lens connector terminal among the twelve lens connector terminals.

22 Claims, 12 Drawing Sheets

(56) References Cited

U.S. PATENT DOCUMENTS

| | | |
|---|---|---|
| 2013/0077954 A1 | 3/2013 | Oikawa et al. |
| 2013/0077955 A1 | 3/2013 | Imafuji et al. |
| 2013/0077957 A1 | 3/2013 | Oikawa et al. |

FOREIGN PATENT DOCUMENTS

| | | |
|---|---|---|
| JP | A-2008-233773 | 10/2008 |
| JP | A-2010-288307 | 12/2010 |
| JP | A-2012-155290 | 8/2012 |

OTHER PUBLICATIONS

Japanese Office Action issued in Japanese Application No. 2012-191003 dated Dec. 4, 2012 (w/translation).
Japanese Office Action issued in Japanese Application No. 2012-191004 dated Dec. 4, 2012 (w/translation).
Japanese Office Action issued in Japanese Application No. 2012-191005 dated Dec. 4, 2012 (w/translation).
Japanese Office Action issued in Japanese Application No. 2012-191006 dated Dec. 4, 2012 (w/translation).
Japanese Office Action issued in Japanese Application No. 2012-191007 dated Dec. 4, 2012 (w/translation).
U.S. Appl. No. 13/622,699 in the name of Imafuji et al., filed Sep. 19, 2012.
U.S. Appl. No. 13/622,784 in the name of Oikawa et al., filed Sep. 19, 2012.
U.S. Appl. No. 13/622,711 in the name of Imafuji et al., filed Sep. 19, 2012.
U.S. Appl. No. 13/622,828 in the name of Oikawa et al., filed Sep. 19, 2012.
Jun. 7, 2013 Office Action issued in U.S. Appl. No. 13/622,784.
Apr. 30, 2013 Notice of Allowance issued in U.S. Appl. No. 13/622,711.
May 23, 2013 Corrected Notice of Allowability issued in U.S. Appl. No. 13/622,711.
May 10, 2013 Office Action issued in U.S. Appl. No. 13/622,828.
Oct. 22, 2013 Office Action issued in U.S. Appl. No. 13/622,699.

* cited by examiner

EXCHANGEABLE LENS

This non-provisional application claims the benefit of U.S. Provisional Application No. 61/564,550 filed Nov. 29, 2011. This application also claims priority from Japanese Application No. 2011-205066 filed Sep. 20, 2011 and Japanese Application No. 2012-191005 filed Aug. 31, 2012. The disclosure of each of the earlier applications is incorporated herein by reference in its entirety.

BACKGROUND OF THE INVENTION

1. Field of the Invention

The present invention relates to an exchangeable lens.

2. Description of Related Art

The camera body in a camera system known in the related art may engage in electrical communication with an exchangeable lens. Japanese Laid Open Patent Publication No. H7-234432 discloses an exchangeable lens that includes a group of terminals enabling the exchangeable lens to communicate with the camera body and an adapter (e.g., an intermediate ring or a rear focus converter). The terminals in this terminal group are disposed next to one another so as to form a circular arc pattern, and another group of terminals, through which power is provided from the camera body to the exchangeable lens and the adapter, is disposed next to one end of the terminal group.

SUMMARY OF THE INVENTION

There is an issue yet to be addressed with regard to the exchangeable lens disclosed in the publication cited above in that individual terminals cannot be visually identified.

An exchangeable lens according to a 1st aspect of the present invention, comprises: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member, wherein: the twelve lens connector terminals are: a first lens connector terminal through which a drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a shape of at least one lens connector terminal among the twelve lens connector terminals is different from a shape of another lens connector terminal among the twelve lens connector terminals.

According to a 2nd aspect of present invention, in the exchangeable lens according to the 1st aspect, it is preferable that the at least one lens connector terminal among the twelve lens connector terminals adopts a shape formed relative to the mount center point different from the shape of another lens connector terminal among the twelve lens connector terminals relative to the mount center point.

According to a 3rd aspect of the present invention, in the exchangeable lens according to the 2nd aspect, an interior angle formed at the mount center point representing a width of the at least one lens connector terminal among the twelve lens connector terminals, may be different from an interior angle formed at the mount center point representing an width of the other lens connector terminal.

According to a 4th aspect of the present invention, in the exchangeable lens according to the 1st aspect, the one lens connector terminal may be disposed so as to surround a lens connector terminal other than the one lens connector terminal, among the twelve lens connector terminals.

According to a 5th aspect of the present invention, in the exchangeable lens according to the 1st aspect, the one lens connector terminal may adopt a square shape.

According to a 6th aspect of the present invention, in the exchangeable lens according to the 1st aspect, the one lens connector terminal may adopt a U shape.

According to a 7th aspect of the present invention, in the exchangeable lens according to the 1st aspect, the one lens connector terminal may adopt an L shape.

An exchangeable lens according to an 8th aspect of the present invention, comprises: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member, wherein: the twelve lens connector terminals, each including an exposed area exposed at a surface of the holding portion, are: a first lens connector terminal through which a drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a shape of an exposed area of at least one lens connector terminal among the twelve lens connector terminals is different from a shape of an exposed area of another lens connector terminals.

According to a 9th aspect of the present invention, in the exchangeable lens according to the 8th aspect, it is preferable that the exposed area of the at least one lens connector terminal among the twelve lens connector terminals adopts a shape formed relative to the mount center point different from a shape of the exposed area of the other lens connector terminal among the twelve lens connector terminals relative to the mount center point.

According to a 10th aspect of the present invention, in the exchangeable lens according to the 9th aspect, it is preferable that an interior angle formed at the mount center point representing a width of the exposed area of the at least one lens connector terminal among the twelve lens connector terminals, is different from an interior angle formed at the mount center point representing a width of the exposed area of the other lens connector terminal.

According to an 11th aspect of the present invention, in the exchangeable lens according to the 8th aspect, the exposed area of the one lens connector terminal may be disposed so as to surround the exposed area of the other lens connector terminal among the twelve lens connector terminals.

According to a 12th aspect of the present invention, in the exchangeable lens according to the 8th aspect, the exposed area of the one lens connector terminal may adopt a square shape.

According to a 13th aspect of the present invention, in the exchangeable lens according to the 8th aspect, the exposed area of the one lens connector terminal may adopt a U shape.

According to a 14th aspect of the present invention, in the exchangeable lens according to the 8th aspect, the exposed area of the one lens connector terminal may adopt an L shape.

According to a 15th aspect of the present invention, in the exchangeable lens according to any one of the 1st through 14th aspects, the one lens connector terminal may be either the second lens connector terminal or the twelfth lens connector terminal.

DESCRIPTION OF PREFERRED EMBODIMENTS

First Embodiment

Figure 1:
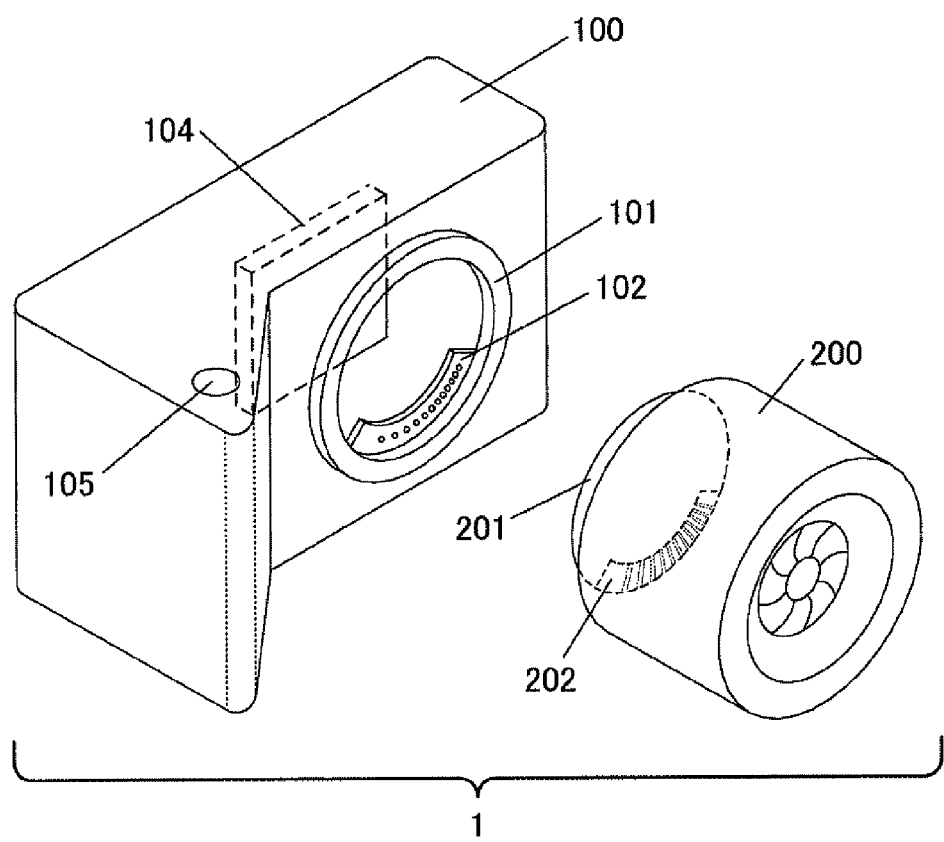
FIG. 1 is a perspective of a camera system compatible with exchangeable lenses achieved in a first embodiment of the present invention.

FIG. 1 is a perspective of a camera system compatible with exchangeable lenses achieved in the first embodiment of the present invention. It is to be noted that FIG. 1 only shows the units and devices relevant to the present invention and that an illustration and an explanation of other units and devices are not provided. A camera system 1 comprises a camera body 100 and an exchangeable lens (photographic lens) 200 that can be detachably mounted at the camera body 100.

The camera body 100 includes a camera body mount unit 101 adopting a bayonet structure at which the exchangeable lens 200 is detachably mounted. A holding portion (electrical connector portion) 102, projecting out on the inner circumferential side of the camera body mount unit 101 over part of the inner circumference, with twelve body connector terminals held thereat, is disposed in an area near the camera body mount unit 101 (on the inner circumferential side of the camera body mount unit 101).

In addition, a camera lens mount unit 201, corresponding to the camera body mount unit 101, at which the camera body 100 is detachably mounted, is disposed at the exchangeable lens 200. A holding portion (electrical connector portion) 202, projecting out toward the inner circumferential side of the camera lens mount unit 201 over part of the inner circumference, with twelve lens connector terminals held thereat, is disposed in an area near the camera lens mount unit 201 (on the inner circumferential side of the camera lens mount unit 201).

The camera lens mount unit 201 can be inserted through the camera body mount unit 101 by aligning an index mark (not shown) on the exchangeable lens 200, indicating the rotational position, with a similar index mark on the camera body 100 with the center of the opening at the camera body mount unit 101 set in alignment with the optical axis of the exchangeable lens 200. Subsequently, as the exchangeable lens 200 is turned along the counterclockwise direction viewed from the front side of the camera body 100, a tab at the camera lens mount unit 201 moves into a space behind a tab at the camera body mount unit 101. When the exchangeable lens is turned by a predetermined angle, the camera lens mount unit 201 becomes engaged with the camera body mount unit 101 (the lens side tab and the body side tab become completely engaged) and thus, the mounting process for the exchangeable lens 200 is completed.

As the exchangeable lens 200 is engaged with the camera body 100, the plurality of body connector terminals held at the holding portion 102 (to be described in detail later) become electrically and physically connected with the plurality of lens connector terminals held at the holding portion 202 (to be described in detail later). These terminals are used to provide power from the camera body 100 to the exchangeable lens 200 and to exchange signals between the camera body 100 and the exchangeable lens 200.

An image sensor 104 is disposed inside the camera body 100 at a position rearward relative to the camera body mount unit 101. A button 105, functioning as an input device, is disposed on the top side of the camera body 100. The user is able to issue a photographing instruction, a photographing condition setting instruction or the like to the camera body 100 by operating an input device such as the button 105.

Figure 2:
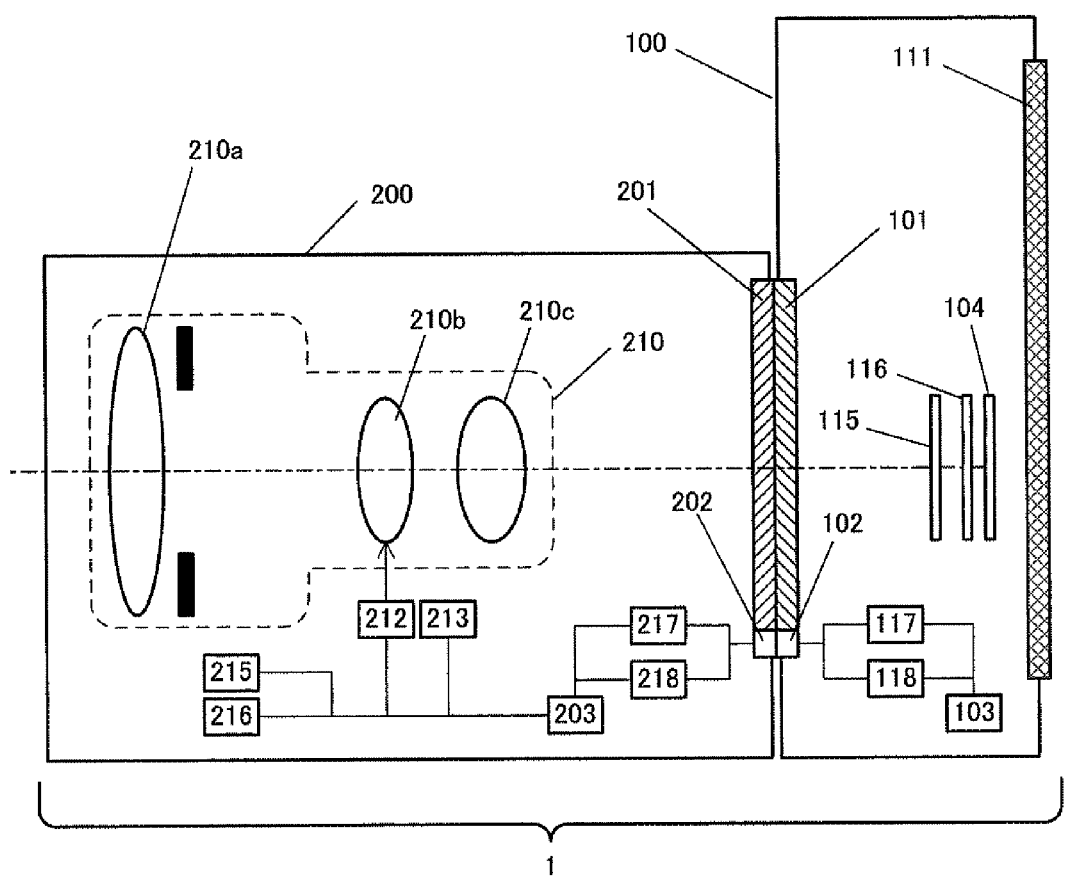
FIG. 2 is a sectional view of the camera system compatible with exchangeable lenses achieved in the first embodiment of the present invention.

FIG. 2 is a sectional view of the camera system 1 compatible with exchangeable lenses achieved in the first embodiment of the present invention. The exchangeable lens 200 includes an image forming optical system 210 via which a subject image is formed. The image forming optical system 210 is constituted with a plurality of lenses 210*a* through 210*c*. The plurality of lenses 210*a* through 210*c* includes a focusing lens 210*b*.

A lens control unit 203, which controls the various components constituting the exchangeable lens 200, is disposed inside the exchangeable lens 200. The lens control unit 203 comprises a microcomputer, its peripheral circuits and the like (none shown). A first lens-side communication unit 217, a second lens-side communication unit 218, a lens drive unit 212, a lens position detection unit 213, a ROM 215 and a RAM 216 are connected to the lens control unit 203.

The first lens-side communication unit 217 and the second lens-side communication unit 218 exchange data with the camera body 100 via terminals at the holding portions 102 and 202. The first lens-side communication unit 217 and the second lens-side communication unit 218 each function as a communication interface for the exchangeable lens 200. The lens control unit 203 engages in various types of communication (hotline communication and command data communication) with the camera body 100 (with a body control unit 103 to be described in detail later) via these communication interfaces, as will be explained later.

The lens drive unit 212, which includes an actuator such as a stepping motor, drives the focusing lens 210*b* in response to a signal input to the lens drive unit 212. The lens position detection unit 213 detects the position of the focusing lens 210*b* by, for instance, counting the number of signal pulses input to the stepping motor in the lens drive unit 212. It may instead detect the position of the focusing lens 210*b* via a distance encoder or the like of the known art disposed at the exchangeable lens 200.

It is to be noted that a drive target member other than the focusing lens 210*b* described above may be disposed in the exchangeable lens 200. For instance, a zoom lens, which is allowed to move along the optical axis of the exchangeable lens 200 (the image forming optical system 210), as is the focusing lens 210*b*, may be included in the exchangeable lens 200, together with a mechanism (widely known as a power zoom mechanism) that electrically drives the zoom lens. In addition, a blur correction mechanism equipped with a blur correction lens, movable along directions that include directional components (X and Y direction components) perpendicular to the optical axis of the image forming optical system 210, which corrects image blur by driving the blur correction lens, may be disposed in the exchangeable lens 200. Furthermore, an aperture drive mechanism for controlling drive of an aperture member (aperture blades) that can be moved so as to alter the size of an aperture opening, through which a subject light flux passes, may be disposed in the exchangeable lens 200. The lens control unit 203 in an exchangeable lens that includes such drive target members controls the drive and the position detection executed for the individual drive target members, i.e., the blur correction lens, the aperture member and the zoom lens, via the lens drive unit 212 and the lens position detection unit 213.

The ROM 215 is a nonvolatile storage medium into which a specific control program, to be executed by the lens control unit 203, and the like are stored in advance. The RAM 216 is a volatile storage medium used by the lens control unit 203 as a storage area where various types of data are stored.

A shutter 115, via which the exposure conditions at the image sensor 104 are controlled, and an optical filter 116, which is an integrated filter achieved by combining an optical low pass filter and an infrared cut-off filter, are disposed in front of the image sensor 104. The subject light having been transmitted through the image forming optical system 210 enters the image sensor 104 via the shutter 115 and the filter 116.

The body control unit 103, engaged in control of the various components of the camera body 100, is disposed inside the camera body 100. The body control unit 103 is constituted with a microcomputer, a RAM, peripheral circuits and the like (none shown).

A first body-side communication unit 117 and a second body-side communication unit 118 are connected to the body control unit 103. The first body-side communication unit 117 is connected to the holding portion 102 and is able to exchange data with the first lens-side communication unit 217. The second body-side communication unit 118 is likewise able to exchange data with the second lens-side communication unit 218. Namely, the first body-side communication unit 117 and the second body-side communication unit 118 each function as a body-side communication interface. The body control unit 103 engages in various types of communication (hotline communication and command data communication) with the exchangeable lens 200 (with the lens control unit 203) via these communication interfaces, as will be explained later.

A display device 111 constituted with an LCD panel or the like is disposed at the rear surface of the camera body 100. The body control unit 103 brings up on display at the display device 111 a subject image (referred to as a live view image) based upon an output from the image sensor 104 or various types of menu screens enabling selection of photographing conditions and the like.

(Description of the Holding Portions 102 and 202)

Figure 3:
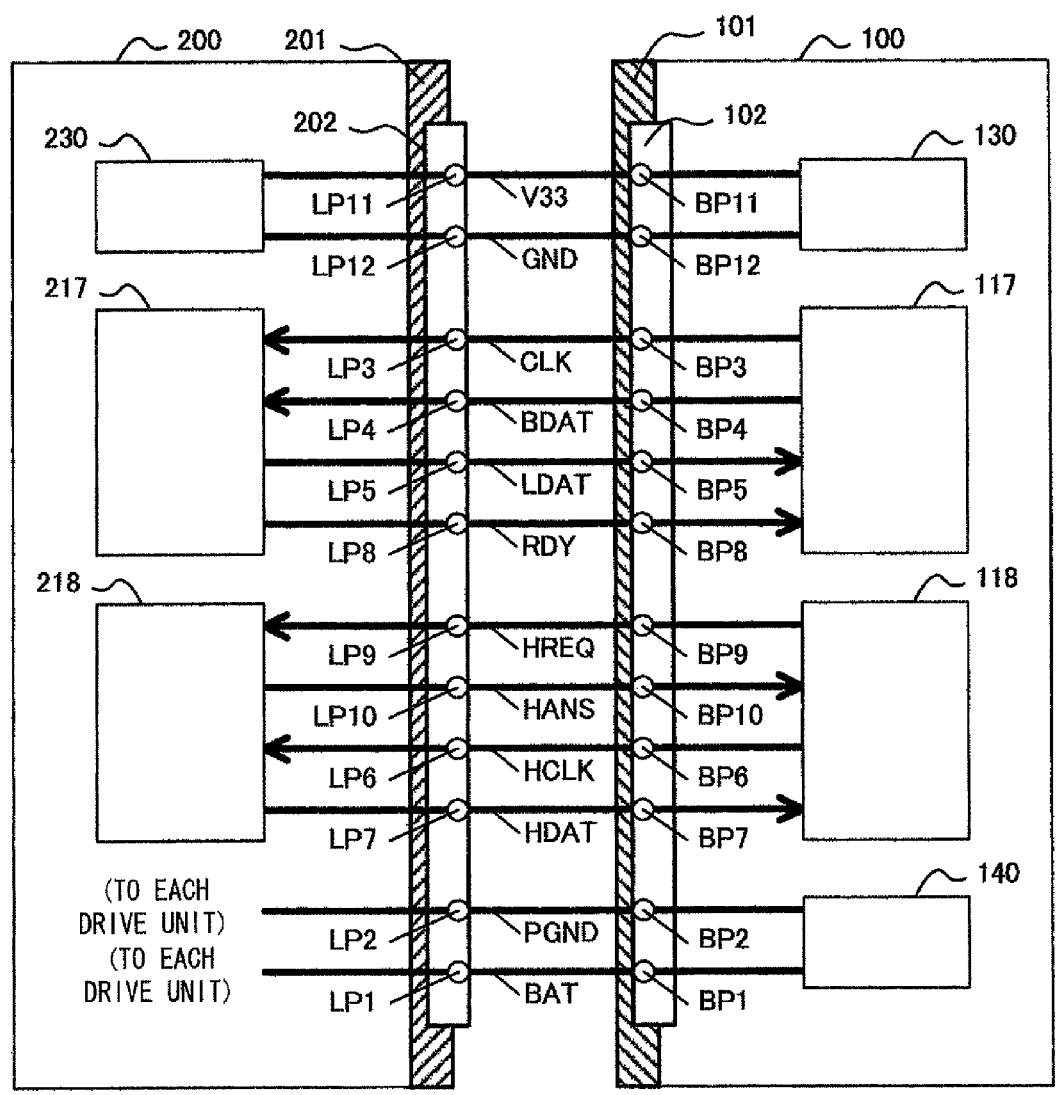
FIG. 3 is a schematic diagram showing in detail holding portions.

FIG. 3 is a schematic diagram showing structural details of the holding portions 102 and 202. As shown in FIG. 3, twelve body connector terminals BP1 through BP12 are present at the holding portion 102. In addition, twelve lens connector terminals LP1 through LP12, each corresponding to one of the twelve body connector terminals at the holding portion 102, are present at the holding portion 202.

The eleventh body connector terminal BP11 and the twelfth body connector terminal BP12 are connected to a first power supply circuit 130 located in the camera body 100. The first power supply circuit 130 provides an operating voltage to the eleventh body connector terminal BP11, via which the operating voltage is supplied to various components disposed in the exchangeable lens 200 except for the lens drive unit 212. In other words, an operating voltage on which the various components in the exchangeable lens 200 (including the first lens-side communication unit 217 and the second lens-side communication unit 218) except for the lens drive unit 212 operate, is provided via the eleventh body connector terminal BP11 and the eleventh lens connector terminal LP11. While a specific range (e.g., a voltage range from 3 to 4 v), defined by a minimum voltage value and a maximum voltage value, is assumed for the voltage value representing the level of voltage that can be provided to the eleventh body connector terminal BP11, the voltage value of the voltage typically provided to the eleventh body connector terminal BP11 is close to the median of the maximum voltage value and the minimum voltage value. The value of the electric current provided from the camera body 100 to the exchangeable lens 200 in conjunction with the operating voltage will be in the range of approximately several tens of mA to several hundreds of mA in a power ON state.

The twelfth body connector terminal BP12 is a ground terminal that corresponds to the operating voltage provided to the eleventh body connector terminal BP11. Namely, the twelfth body connector terminal BP12 and the twelfth lens connector terminal LP12 are ground terminals that correspond to the operating voltage.

In the following description, the signal line formed with the eleventh body connector terminal BP11 and the eleventh lens connector terminal LP11 will be referred to as a signal line V33. The signal line formed with the twelfth body connector terminal BP12 and the twelfth lens connector terminal LP12 will be referred to as a signal line GND. The eleventh lens connector terminal LP11, the twelfth lens connector terminal LP12, the eleventh body connector terminal BP11 and the twelfth body connector terminal BP12 are power supply system connector terminals used to provide power from the camera body 100 to the exchangeable lens 200.

The third body connector terminal BP3, the fourth body connector terminal BP4, the fifth body connector terminal BP5 and the eighth body connector terminal BP8 are connected to the first body-side communication unit 117. The third lens connector terminal LP3, the fourth lens connector terminal LP4, the fifth lens connector terminal LP5 and the eighth lens connector terminal LP8 at the exchangeable lens 200, corresponding to the body connector terminals BP3, BP4, BP5 and 13P8, are connected to the first lens-side communication unit 217. The first body-side communication unit 117 and the first lens-side communication unit 217 exchange data with each other via these terminals (communication system terminals). The communication carried out by the first body-side communication unit 117 and the first lens-side communication unit 217 will be described in detail later.

It is to be noted that the signal line formed with the third body connector terminal BP3 and the third lens connector terminal LP3 will be referred to as a signal line CLK in the following description. In addition, the signal line formed with the fourth body connector terminal BP4 and the fourth lens connector terminal LP4 will be referred to as a signal line BDAT, the signal line formed with the fifth body connector terminal BP5 and the fifth lens connector terminal LP5 will be referred to as a signal line LDAT and the signal line formed with the eighth body connector terminal BP8 and the eighth lens connector terminal LP8 will be referred to as a signal line RDY.

The ninth body connector terminal BP9, the tenth body connector terminal BP10, the sixth body connector terminal BP6 and the seventh body connector terminal BP7 are connected to the second body-side communication unit 118. The ninth lens connector terminal LP9, the tenth lens connector terminal LP10, the sixth lens connector terminal LP6 and the seventh lens connector terminal LP7 at the exchangeable lens 200, corresponding to these body connector terminals, are connected to the second lens-side communication unit 218. The second lens-side communication unit 218 transmits data to the second body-side communication unit 118 via these terminals (communication system terminals). The communication carried out by the second body-side communication unit 118 and the second lens-side communication unit 218 will be described in detail later.

It is to be noted that the signal line formed with the ninth body connector terminal BP9 and the ninth lens connector terminal LP9 will be referred to as a signal line HREQ. In addition, the signal line formed with the tenth body connector terminal BP10 and the tenth lens connector terminal LP10 will be referred to as a signal line HANS, the signal line formed with the sixth body connector terminal BP6 and the sixth lens connector terminal LP6 will be referred to as a signal line HCLK and the signal line formed with the seventh body connector terminal BP7 and the seventh lens connector terminal LP7 will be referred to as a signal line HDAT.

The first body connector terminal BP1 and the second body connector terminal BP2 are connected to a second power supply circuit 140 located in the camera body 100. The second power supply circuit 140 provides a drive voltage to be used to drive the lens drive unit 212, to the first body connector terminal BP1. In other words, the drive voltage for the lens drive unit 212 is provided via the first body connector terminal BP1 and the first lens connector terminal LP1. While the voltage value indicating the level of voltage that can be provided to the first body connector terminal BP1 assumes a range defined by a minimum voltage value and a maximum voltage value, the voltage value is never smaller than the voltage value indicating the level of voltage that can be provided to the eleventh body connector terminal BP11 assuming its own specific voltage value range as has been explained earlier. For instance, the maximum voltage value indicating the highest level of voltage that can be provided to the first body connector terminal BP1 may be several times the maximum voltage value indicating the highest level of voltage that can be supplied to the eleventh body connector terminal BP11. In other words, the voltage value indicating the level of voltage provided to the first body connector terminal BP1 is always different from the voltage value indicating the level of voltage provided to the eleventh body connector terminal BP11. It is to be noted that the voltage value indicating the level of voltage provided to the first body connector terminal BP1 under normal circumstances is close to the median of the maximum voltage value and the minimum voltage value assumed for the first body connector terminal BP1. The value of the electric current provided from the camera body 100 to the exchangeable lens 200 in conjunction with the drive voltage will be in the range of approximately several tens of mA to several A in the power ON state.

The second body connector terminal BP2 is a ground terminal that corresponds to the drive voltage provided to the first body connector terminal BP1. Namely, the second body connector terminal BP2 and the second lens connector terminal LP2 are ground terminals that correspond to the drive voltage.

In the following description, the signal line formed with the first body connector terminal BP1 and the first lens connector terminal LP1 will be referred to as a signal line BAT. The signal line formed with the second body connector terminal BP2 and the second lens connector terminal LP2 will be referred to as a signal line PGND. This means that the first body connector terminal BP1, the first lens connector terminal LP1, the second body connector terminal BP2 and the second lens connector terminal LP2 are power supply system terminals used to provide power from the camera body 100 to the exchangeable lens 200.

It is to be noted that as the varying ranges assumed for the voltage value (current value) indicating the level of voltage provided via the first body connector terminal BP1 and the first lens connector terminal LP1 and for the voltage value (current value) indicating the level of voltage provided via the eleventh body connector terminal BP11 and the eleventh lens connector terminal LP11 clearly indicate, the difference between the maximum value and the minimum value taken for the electric current flowing through the second body connector terminal BP2 and the second lens connector terminal LP2, i.e., through the ground terminals corresponding to the voltage provided through the connector terminals BP1 and LP1, is greater than the difference between the maximum value and the minimum value taken for the electric current flowing through the twelfth body connector terminal BP12 and the twelfth lens connector terminal LP12, i.e., the ground terminals corresponding to the voltage provided through the connector terminals BP11 and LP11. A greater difference is assumed between the maximum value and the minimum value taken for the electric current flowing through the connector terminals BP2 and LP2, since greater power is used in the lens drive unit 212 equipped with a drive system such as an actuator, compared to the power used in the electronic circuits, e.g., the lens control unit 203, in the exchangeable lens 200 and also, the lens drive unit 212 does not use any power at all if it does not need to drive the focusing lens 210b.

Figure 4A:
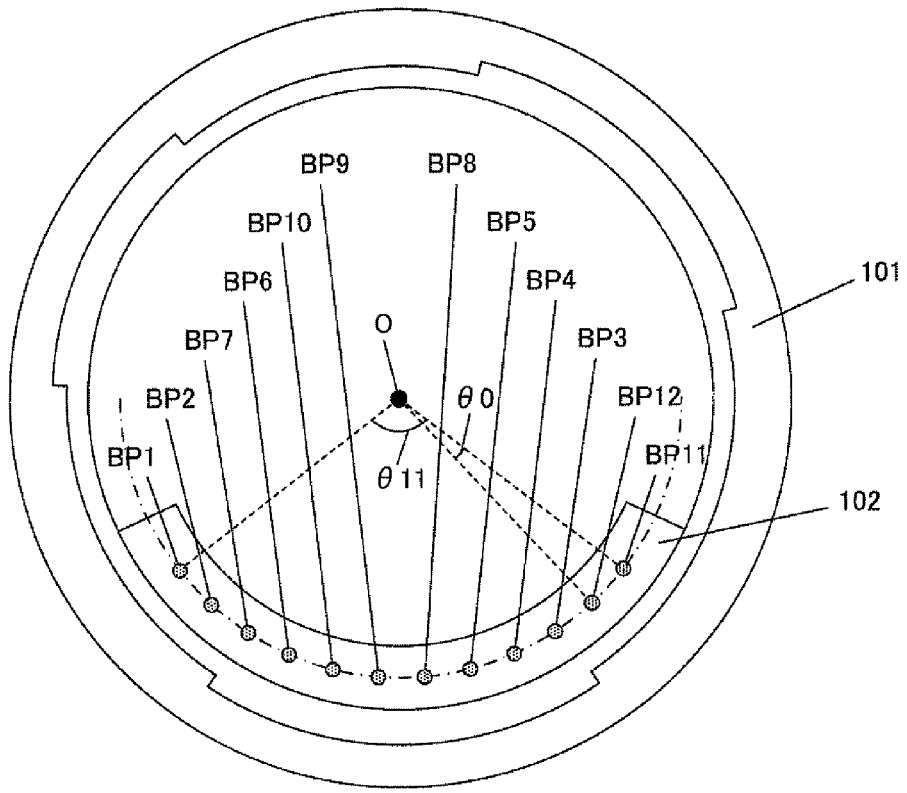
FIGS. 4A and 4B respectively show a camera body mount unit in a front view and associated holding portion in an enlarged view.
Figure 4B:
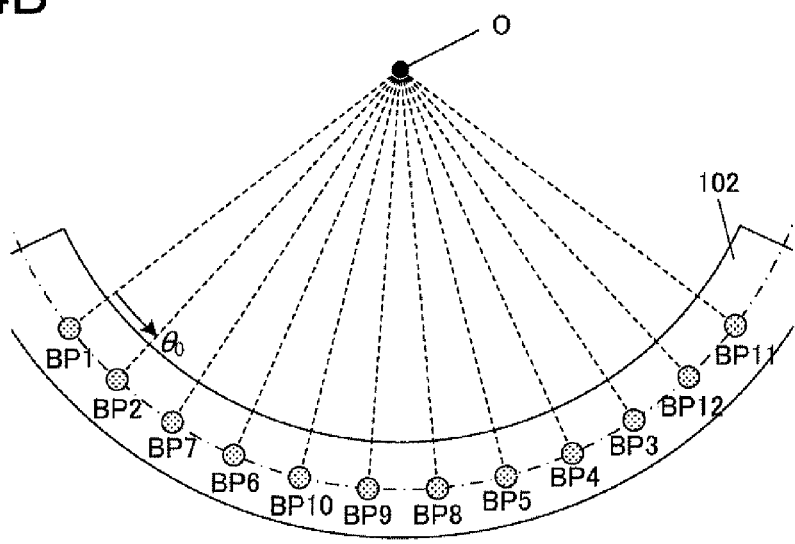
Figure 5A:
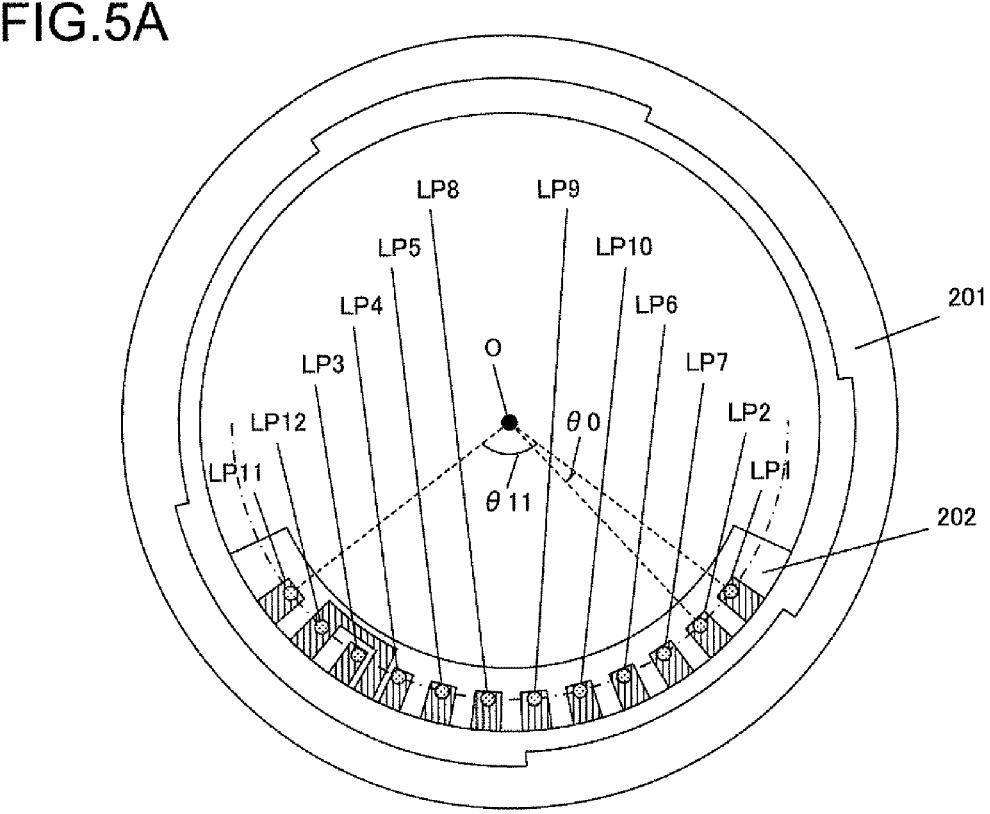
FIGS. 5A and 5B respectively show a camera lens mount unit in a front view and associated holding portion in an enlarged view.
Figure 5B:
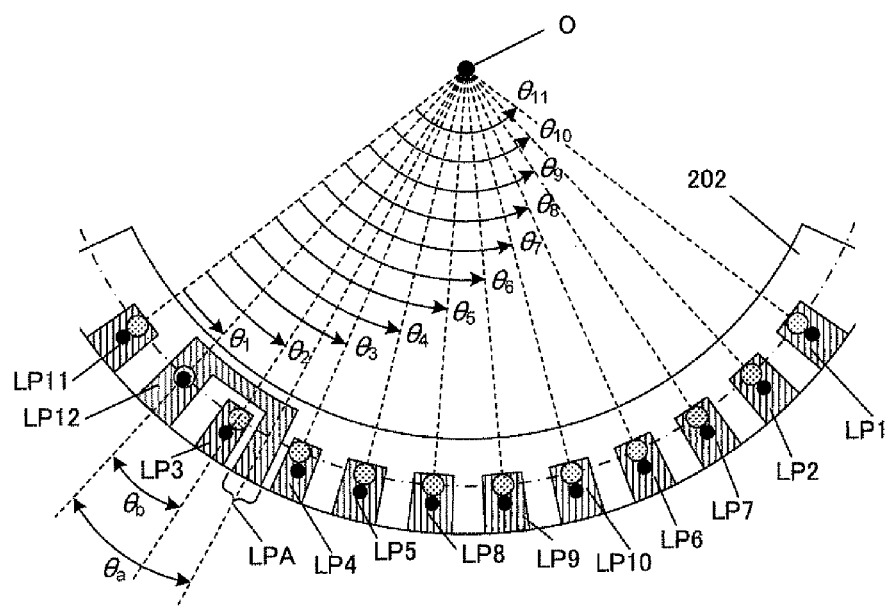

FIGS. 4A and 4B show the camera body mount unit 101 in front views. FIG. 4A shows the camera body mount unit 101 at the camera body 100 viewed from the side where the exchangeable lens 200 is present, whereas FIG. 4B shows the holding portion 102 in FIG. 4A in an enlargement. FIGS. 5A and 513 show the camera lens mount unit 201 in front views. FIG. 5A shows the camera lens mount unit 201 at the exchangeable lens 200 viewed from the side where the camera body 100 is present, whereas FIG. 5B shows the holding portion 202 in FIG. 5A in an enlargement. The mount units each assume a circular shape and the center of the circle will be referred to as a mount center point O in the following description.

As shown in FIG. 4A, the holding portion 102 is disposed at a position inward relative to the mount surface of the camera body mount unit 101 (deeper into the drawing sheet on which FIG. 4A is provided). In addition, FIG. 5 indicates that the holding portion 202 is disposed at a position outward relative to the mount surface of the camera lens mount unit 201 (toward the person viewing FIG. 5A). Once the exchangeable lens 200 is mounted at the camera body 100 by engaging the camera body mount unit 101 with the camera lens mount unit 201 through the procedure described earlier, the holding portion 102 and the holding portion 202 become connected with each other and thus, the twelve body connector terminals BP1 through BP12 and the twelve lens connector terminals LP1 through LP12 disposed at the two holding portions become connected with each other. The one-point chain lines, drawn over the twelve body connector terminals BP1 through BP12 and the twelve lens connector terminals LP1 through LP12 in FIGS. 4A and 4B and FIGS. 5A and 5B indicate a locus through which the twelve body connector terminals BP1 through BP12 move when the camera body 100 is coupled with the exchangeable lens 200. Since this mount structure is of the known art, further explanation is not provided.

As shown in FIG. 4A, the twelve body connector terminals BP1 through BP12 each assume a cylindrical shape and a force imparted from a spring or the like disposed inside the holding portion 102 presses them toward the front of the camera body mount unit 101 (toward the exchangeable lens 200). In addition, as shown in FIG. 5A, the twelve lens connector terminals LP1 through LP12 each include a substantially rectangular conductor exposed at the surface of the holding portion 202. Once the holding portion 102 is connected with the holding portion 202, the body connector terminals are each pressed against a lens connector terminal by the force imparted from the spring or the like as described above and thus, electrical continuity is achieved between the lens connector terminals and the body connector terminals. It is to be noted that the circles drawn over the twelve lens connector terminals LP1 through LP12 in FIG. 5A and FIG.

5B indicate the positions at which the corresponding body connector terminals are pressed against the lens connector terminals.

In the following description, the particular area of each of the twelve lens connector terminals LP1 through LP12 that comes into contact with the corresponding body connector terminal when the camera body 100 and the exchangeable lens 200 are engaged with each other will be referred to as a contact area (an area indicated by each of the circles in FIG. 5A). In addition, the phrase "when the camera body 100 and the exchangeable lens 200 are engaged with each other" is used to refer to a state in which a voltage is supplied from the eleventh body connector terminal BP11 to the eleventh lens connector terminal LP11. It is to be noted that the term "lens connector terminal" used in the description of the embodiment refers to an entire terminal that includes an electrical wiring (a lead wire, a flexible cable or the like) used to connect the substantially rectangular area (which includes the contact area) exposed at the surface of the holding portion 202, indicated as a shaded area in FIG. 5A, with the first lens-side communication unit 217 or the second lens-side communication unit 218, as well as the rectangular area itself. In addition, the areas of the lens connector terminals LP1 through LP12 exposed at the surface of the holding portion 202, indicated as the shaded areas as explained above, may be referred to as "exposed areas" of the lens connector terminals LP1 through LP12 in the following description. In the following explanation, "a central portion of a lens connector terminal" indicates a center of the exposed area of the given lens connector terminal, as indicated by a black dot shown in FIG. 5B. It is to be noted that the exposed areas will be explained in detail later by referring to FIG. 11.

As shown in FIG. 5A, the twelve lens connector terminals LP1 through LP12 (the exposed areas of the twelve lens connector terminals) are set in the holding portion 202 of the camera lens mount unit 201 so as to form a circular arc centered on the mount center point O and ranging along the camera lens mount unit 201 (along part of the camera lens mount unit 201 assuming a substantially circular shape on the outside).

Next, in reference to FIG. 5B, the positional relationship among the twelve lens connector terminals LP1 through LP12 (its exposed areas) will be described. An interior angle θ11, formed by the contact area of the first lens connector terminal LP1 and the contact area of the eleventh lens connector terminal LP11 at the mount center point O, is the largest among interior angles, each formed by the contact areas of any two randomly selected lens connector terminals among the twelve lens connector terminals LP1 through LP12 at the mount center point O.

An interior angle θ1, formed by the contact area of the eleventh lens connector terminal LP11 and the contact area of the twelfth lens connector terminal LP12 at the mount center point O, is smaller than interior angles θ2 through θ11 each formed by the contact area of a given lens connector terminal among the first lens connector terminal LP1 through the tenth lens connector terminal LP10 and the contact area of the eleventh lens connector terminal LP11 at the mount center point O. The interior angle θ2, formed by the contact area of the third lens connector terminal LP3 and the contact area of the eleventh lens connector terminal LP11 at the mount center point O, is smaller than the interior angles θ3 through θ11 each formed by the contact area of a given lens connector terminal among the first lens connector terminal LP1, the second lens connector terminal LP2 and the fourth lens connector terminal LP4 through the tenth lens connector terminal LP10 and the contact area of the eleventh lens connector terminal LP11 at the mount center point O.

The interior angle θ3, formed by the contact area of the fourth lens connector terminal LP4 and the contact area of the eleventh lens connector terminal LP11 at the mount center point O, is smaller than the interior angles θ4 through θ11 each formed by the contact area of a given lens connector terminal among the first lens connector terminal LP1, the second lens connector terminal LP2 and the fifth lens connector terminal LP5 through the tenth lens connector terminal LP10 and the contact area of the eleventh lens connector terminal LP11 at the mount center point O. The interior angle θ4, formed by the contact area of the fifth lens connector terminal LP5 and the contact area of the eleventh lens connector terminal LP11 at the mount center point O, is smaller than the interior angles θ5 through θ11 each formed by the contact area of a given lens connector terminal among the first lens connector terminal LP1, the second lens connector terminal LP2 and the sixth lens connector terminal LP6 through the tenth lens connector terminal LP10 and the contact area of the eleventh lens connector terminal LP11 at the mount center point O.

The interior angle θ5, formed by the contact area of the eighth lens connector terminal LP8 and the contact area of the eleventh lens connector terminal LP11 at the mount center point O, is smaller than the interior angles θ6 through θ11 each formed by the contact area of a given lens connector terminal among the first lens connector terminal LP1, the second lens connector terminal LP2, the sixth lens connector terminal LP6, the seventh lens connector terminal LP7, the ninth lens connector terminal LP9 and the tenth lens connector terminal LP10 and the contact area of the eleventh lens connector terminal LP11 at the mount center point O. The interior angle θ6, formed by the contact area of the ninth lens connector terminal LP9 and the contact area of the eleventh lens connector terminal LP11 at the mount center point O, is smaller than the interior angles θ7 through θ11 each formed by the contact area of a given lens connector terminal among the first lens connector terminal LP1, the second lens connector terminal LP2, the sixth lens connector terminal LP6, the seventh lens connector terminal LP7 and the tenth lens connector terminal LP10 and the contact area of the eleventh lens connector terminal LP11 at the mount center point O.

The interior angle θ7, formed by the contact area of the tenth lens connector terminal LP10 and the contact area of the eleventh lens connector terminal LP11 at the mount center point O, is smaller than the interior angles θ8 through θ11 each formed by the contact area of a given lens connector terminal among the first lens connector terminal LP1, the second lens connector terminal LP2, the sixth lens connector terminal LP6 and the seventh lens connector terminal LP7 and the contact area of the eleventh lens connector terminal LP11 at the mount center point O. The interior angle θ8, formed by the contact area of the sixth lens connector terminal LP6 and the contact area of the eleventh lens connector terminal LP11 at the mount center point O, is smaller than the interior angles θ9 through θ11 each formed by the contact area of a given lens connector terminal among the first lens connector terminal LP1, the second lens connector terminal LP2 and the seventh lens connector terminal LP7 and the contact area of the eleventh lens connector terminal LP11 at the mount center point O.

The interior angle θ9, formed by the contact area of the seventh lens connector terminal LP7 and the contact area of the eleventh lens connector terminal LP11 at the mount center point O, is smaller than the interior angles θ10 and θ11 each formed by the contact area of either the first lens connector terminal LP1 or the second lens connector terminal LP2 and the contact area of the eleventh lens connector terminal LP11 at the mount center point O. The interior angle θ10, formed by the contact area of the second lens connector terminal LP2 and the contact area of the eleventh lens connector terminal LP11 at the mount center point O, is smaller than the interior angle θ11 formed by the contact area of the first lens connector terminal LP1 and the contact area of the eleventh lens connector terminal LP11 at the mount center point O.

Figure 9:
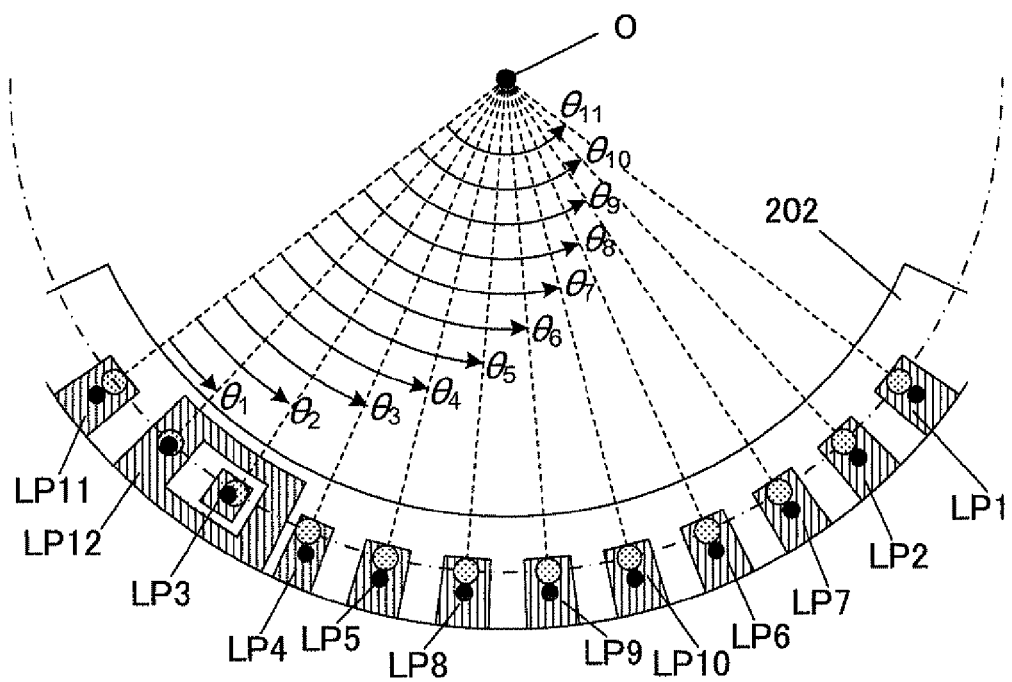
FIG. 9 is a front view of a holding portion different from that in the first embodiment.
Figure 12:
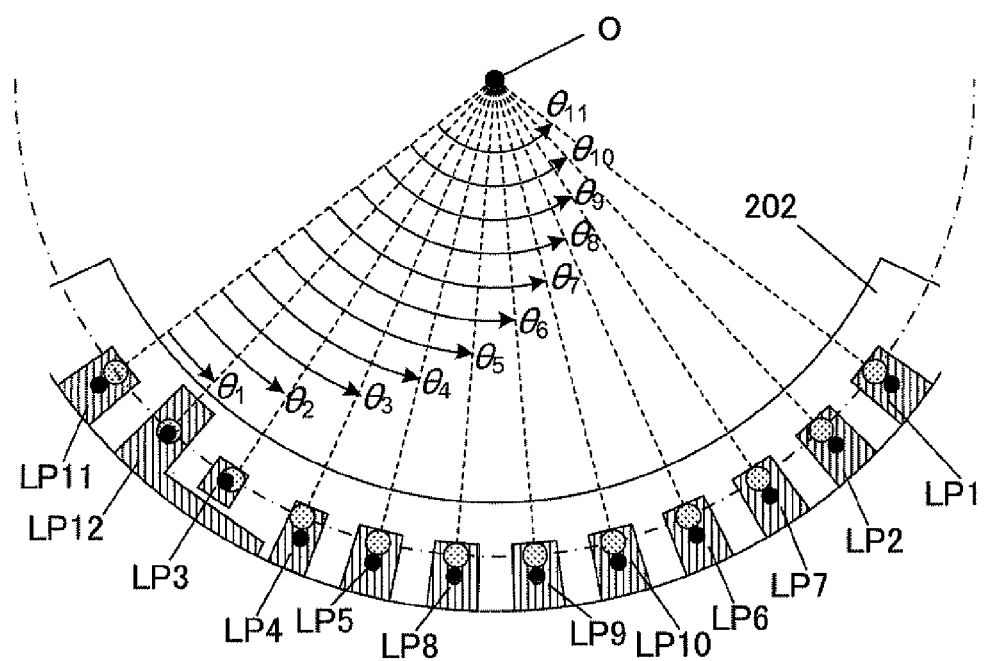
FIG. 12 is a front view of a holding portion different from that achieved in the first embodiment

The twelve lens connector terminals LP1 through LP12 (their exposed areas) are disposed at the holding portion 202 so as to achieve the positional relationship described above. In addition, while the surfaces (the exposed area) of the individual lens connector terminals exposed at the holding portion 202 assume shapes basically identical to one another (i.e., a substantially rectangular shape), the twelfth lens connector terminal LP12 (its exposed area) is shaped differently from the rest of the lens connector terminals (their exposed areas). A portion of the twelfth lens connector terminal LP12 (its exposed area), which is not part of the contact area (i.e., the area of the twelfth lens connector terminal indicated as LPA in FIG. 5B), ranges between the third lens connector terminal LP3 and the fourth lens connector terminal LP4. This means that an interior angle θa formed at the mount center point O by the contact area and non-contact portion LPA of the twelfth lens connector terminal LP12 (its exposed area) is greater than an interior angle θb formed at the mount center point O by the contact area of the twelfth lens connector terminal LP12 and the contact area of the third lens connector terminal LP3. As FIG. 5B clearly indicates, this area LPA assumes a position at which it comes into contact with some of the twelve body connector terminals BP1 through BP12 while the camera body 100 is being attached to the camera lens mount unit 201, but is not connected with any body connector terminal once the camera body 100 and the exchangeable lens 200 are fully engaged with each other. This feature may not be limited to the twelfth lens connector terminal LP12. In other words, at least one lens connector terminal (its exposed area) among the twelve lens connector terminals adopts a shape formed relative to the mount center point different from that of another lens connector terminal (its exposed area) relative to the mount center point. For instance, the twelfth lens connector terminal LP12 (its exposed area) may be formed in a U shape, as shown in FIG. 5. It is to be noted that such a lens connector terminal (its exposed area) may be formed in a square shape, as will be described in reference to FIG. 9 or in an L shape, as will be described in reference to FIG. 12. It is also to be noted that the phrase "adopts a shape different from that of the other lens connector terminals" means that at least either the length of the particular lens connector terminal measured along the radial direction or the length of the lens connector terminal measured along the circumferential direction is different from the corresponding length of the other lens connector terminal, as in the case with LP12 and LP3 in FIG. 9, FIGS. 10A, 10B and FIG. 12. In addition, the width of a lens connector terminal is the measurement of the lens connector terminal ranging relative to the mount center point. Namely, the width of the lens connector terminal is represented by an interior angle θa formed at the mount center point O, as indicated in FIG. 10B.

It is to be noted that the second lens connector terminal LP2 and the twelfth lens connector terminal LP12, used as ground terminals in conjunction with the first lens connector terminal LP1 and the eleventh lens connector terminal LP11, in the power supply systems, through which source voltages (the operating voltage and the drive voltage described earlier) are provided, are set between the first lens connector terminal LP1 and the third lens connector terminal LP3 through the tenth lens connector terminal LP10, i.e., terminals in the communication systems (communication system terminals), and between the eleventh lens connector terminal LP11 and the communication system terminals, so as to minimize the extent to which the communication system terminals (signal lines) are affected by the power supply system terminals (signal lines).

The signal lines through which the source voltages are supplied (the signal lines running through the first lens connector terminal LP1 and the eleventh lens connector terminal LP11) are each bound to manifest a significant voltage change as the load on the source voltage recipient fluctuates. Such a significant voltage change may adversely affect the communication system signal lines. This adverse effect is minimized in the embodiment by disposing the ground terminals (the second lens connector terminal LP2 and the twelfth lens connector terminal LP12), at which voltages tend to remain stable compared to the power supply terminals (the first lens connector terminal LP1 and the eleventh lens connector terminal LP11), between the communication system terminals (the third lens connector terminal LP3 through the tenth lens connector terminal LP10) and the power supply terminals (the first lens connector terminal LP1 and the eleventh lens connector terminal LP11).

While the group of lens connector terminals connected to the first lens-side communication unit 217, i.e., the third lens connector terminal LP3, the fourth lens connector terminal LP4, the fifth lens connector terminal LP5 and the eighth lens connector terminal LP8, is disposed next to the group of lens connector terminals connected to the second lens-side communication unit 218, i.e., the ninth lens connector terminal LP9, the tenth lens connector terminal LP10, the sixth lens connector terminal LP6 and the seventh lens connector terminal LP7, none of the third lens connector terminal LP3, the fourth lens connector terminal LP4 and the fifth lens connector terminal LP5, connected to the first lens-side communication unit 217, and the sixth lens connector terminal LP6 and the seventh lens connector terminal LP7, connected to the second lens-side communication unit 218, occupies a position next to a terminal connected to a different (other) communication unit (217 or 218). In other words, the eighth lens connector terminal LP8, the ninth lens connector terminal LP9 and the tenth lens connector terminal LP10 are disposed in close proximity to each other, each occupying a position close to a terminal connected to the different (other) communication unit. This positional arrangement is adopted since signals that are not synchronous with a clock signal are transmitted through the eighth lens connector terminal LP8, the ninth lens connector terminal LP9 and the tenth lens connector terminal LP10, as will be described in detail later. In this context the expression "a signal that is not synchronous with a clock signal" refers to a signal that manifests less change compared to the clock signal or a signal synchronous with the clock signal, e.g., a signal manifesting a status change of approximately 1 kHz to several kHz per unit time. Under normal circumstances, a clock signal and a signal synchronous with the clock signal manifest significant changes per unit time of up to several MHz (e.g., a clock signal may manifest an 8 MHz change and a data signal synchronous with the clock signal may manifest a 4 MHz change (depending upon the data volume)) and thus, such changes tend to result in noise. Accordingly, it is desirable to dispose each of the terminals, through which a clock signal or a signal synchronous with a clock signal is transmitted, away from any terminal connected to the different (other) communication unit, so as to minimize the adverse effect on communication. In the embodiment, such a positional arrangement is achieved by disposing the group of terminals (the eighth lens connector terminal LP8, the ninth lens connector terminal LP9 and the tenth lens connector terminal LP10), through which signals asynchronous with the clock signal are transmitted, between the group of terminals (the third lens connector terminal LP3, the fourth lens connector terminal LP4 and the fifth lens connector terminal LP5) through which a clock signal and signals synchronous with the clock signal are transmitted in the first lens-side communication unit 217 and the group of terminals (the sixth lens connector terminal LP6 and the seventh lens connector terminal LP7) through which a clock signal and a signal synchronous with the clock signal are transmitted in the second lens-side communication unit 218.

The ninth lens connector terminal LP9, the tenth lens connector terminal LP10, the sixth lens connector terminal LP6 and the seventh lens connector terminal LP7, less affected by noise, are disposed further toward the second power supply circuit 140, whereas the third lens connector terminal LP3, the fourth lens connector terminal LP4, the fifth lens connector terminal LP5 and the eighth lens connector terminal LP8 are disposed further toward the first power supply circuit 130. The level of power consumption in the lens drive unit 212, to which power is supplied via the second power supply circuit 140, changes greatly depending upon whether or not the lens drive unit 212 is engaged in drive of the focusing lens 210b. This means that the level of electric current flowing through the second lens connector terminal LP2 tends to fluctuate greatly and such a change in the electric current is bound to affect any communication system terminals in the vicinity to an extent greater than a change in the electric current flowing through the twelfth lens connector terminal LP12 would. However, communication is carried out via the lens connector terminals LP9, LP10, LP6 and LP7 over cycles shorter than those of the communication carried out via the lens connector terminals LP3, LP4, LP5 and LP8, as will be explained in further detail later. Thus, even if a communication failure occurs due to a change in the electric current flowing through the second lens connector terminal LP2, the communication can be re-executed promptly. The communication is carried out via the lens connector terminals LP9, LP10, LP6 and LP7 over cycles approximately equal to or less than one tenth of the cycles of the communication carried out via the lens connector terminals LP3, LP4, LP5 and LP8. As will be described in detail later, the communication through the lens connector terminals LP9, LP10, LP6 and LP7 is carried out over 1 ms cycles and the communication through the lens connector terminals LP3, LP4, LP5 and LP8 is carried out over 16 ms cycles in the embodiment. This means that the lens connector terminals LP9, LP10, LP6 and LP7 can be disposed next to the second lens connector terminal LP2 without subjecting them to any significant adverse effect of noise, to which the lens connector terminals LP3, LP4, LP5 and LP8 would be subjected if they were disposed next to the second lens connector terminal LP2.

In addition, the second lens connector terminal LP2 is disposed next to the seventh lens connector terminal LP7, which assures a higher level of noise tolerance compared to the sixth lens connector terminal LP6. As will be described in detail later, a clock signal and a data signal synchronous with the clock signal are respectively transmitted through the sixth lens connector terminal LP6 and the seventh lens connector terminal LP7. If the leading edge or the trailing edge of the clock signal becomes indefinite due to noise, accurate synchronization will not be achieved on the reception side. The signal level of the data signal is sampled with the timing of the leading edge or the trailing edge of the clock signal. In other words, the data signal only needs to assure a clear signal level with the timing of the leading edge or the trailing edge of the clock signal, and thus, the noise tolerance of the data signal is considered higher than that of the clock signal.

It is to be noted that the positional arrangement with which the twelve body connector terminals BP1 through BP12 are disposed in the holding portion 102 at the camera body 100, as shown in FIGS. 4A and 4B, is similar to the positional arrangement adopted for the twelve lens connector terminals LP1 through LP12 at the exchangeable lens 200, and for this reason, a repeated explanation is not provided.

It is also to be noted that the camera body mount unit 101 adopts a mount structure widely known as a bayonet mount system, whereby it is positioned so as to face opposite the camera lens mount unit 201 and is then rotated relative to the camera lens mount unit 201 until it becomes engaged with the camera lens mount unit 201, as FIGS. 1, 4A and 4B, 5A and 513 clearly illustrate. For this reason, the body connector terminals BP1 through BP12 are disposed side-by-side along a direction opposite from the direction in which the lens connector terminals LP1 through LP12 are disposed side-by-side, as shown in FIGS. 4A and 5A. While the eleventh lens connector terminal LP11 is disposed at the left end and the first lens connector terminal LP1 is disposed at the right end in FIG. 5A, the eleventh body connector terminal BP11 is disposed at the right end and the first body connector terminal BP1 is disposed at the left end in FIG. 4A.

When mounting the exchangeable lens 200 at the camera body 100, the camera lens mount unit 201 in FIG. 5A is rotated clockwise. At this time, the twelve body connector terminals BP1 through BP12 disposed in the holding portion 102, pressed against the surface of the holding portion 202, move along the locus indicated by the one-point chain line in FIG. 5A. In other words, during the mounting process in which the camera body 100 is attached to the camera lens mount unit 201, friction is bound to occur between the twelve body connector terminals BP1 through BP12 and the twelve lens connector terminals LP1 through LP12 (including the portion LPA of the twelfth lens connector terminal LP12). The areas (exposed areas) of the twelve lens connector terminals LP1 through LP12 that are exposed over the holding portion 202 are formed so as to allow the body connector terminals BP1 through BP12 to move over them more smoothly than over the surface of the holding portion 202.

Figure 6:
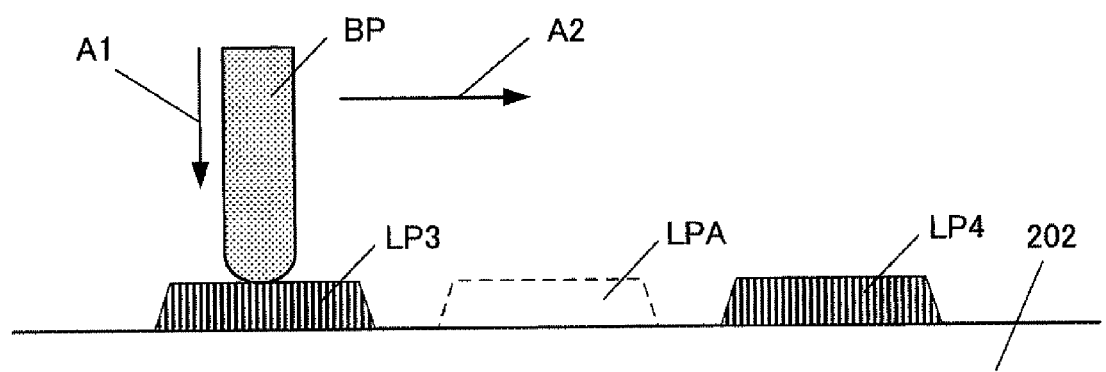
FIG. 6 is a schematic sectional view of a holding portion.

FIG. 6 is a schematic sectional view of the holding portion 202. As explained earlier, a force is applied to the body connector terminals BP along the direction indicated by an arrow A1 (toward the holding portion 202). The twelve lens connector terminals LP1 through LP12 (their exposed areas) assume a height over the surface of the holding portion 202, which is greater than the height of the surface of the holding portion 202. In addition, the height of the portion LPA of the twelfth lens connector terminal LP12 over the holding portion surface is substantially equal to the height of the lens connector terminals. As the body connector terminals BP at the camera body 100 being mounted at the lens mount unit 201 move along the direction indicated by an arrow A2, each body connector terminal BP alternately move over a lens connector terminal and the surface of the holding portion 202.

The twelfth lens connector terminal LP12 in the embodiment includes a portion LPA as described earlier. This means that while the camera body 100 is being mounted, a body connector terminal BP is allowed to move between the third lens connector terminal LP3 and the fourth lens connector terminal LP4 with a lesser extent of vertical displacement (a smaller extent of movement along the up/down direction in FIG. 6), i.e., the body connector terminals BP1 through BP12 are allowed to move more smoothly.

(Description of Command Data Communication)

The lens control unit 203 concurrently receives control data from the first body-side communication unit 117 and transmits response data to the first body-side communication unit 117 over predetermined first cycles (16 ms cycles in the embodiment) via the third lens connector terminal LP3, the fourth lens connector terminal LP4, the fifth lens connector terminal LP5 and the eighth lens connector terminal LP8, i.e., via the signal lines CLK, BDAT, LDAT and RDY, by controlling the first lens-side communication unit 217. The following is a detailed description of the communication carried out by the first lens-side communication unit 217 and the first body-side communication unit 117.

It is to be noted that in the description of the embodiment, the communication carried out by the first lens-side communication unit 217 and the first body-side communication unit 117, respectively under control executed by the lens control unit 203 and the body control unit 103, will be referred to as "command data communication".

Figure 7:
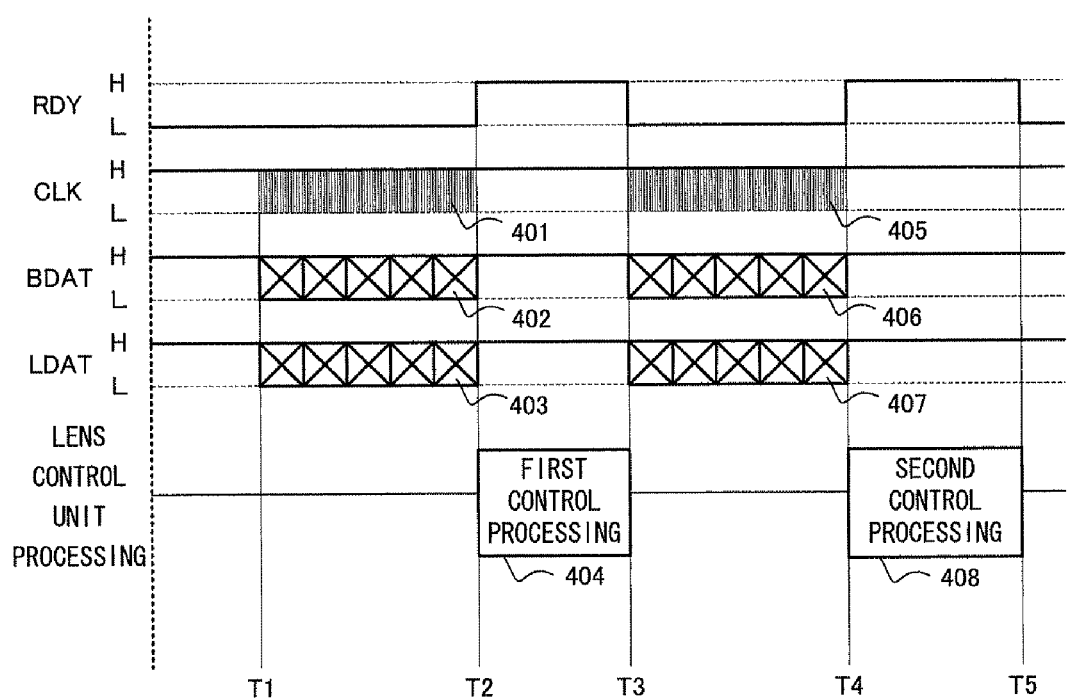
FIG. 7 is a timing chart indicating the timing with which command data communication may be executed.

FIG. 7 is a timing chart indicating the timing with which command data communication may be executed. The body control unit 103 and the first body-side communication unit 117 verify the signal level at the signal line RDY at a command data communication start (T1). The signal level at the signal line RDY indicates whether or not the first lens-side communication unit 217 is in a communication enabled state. If the first lens-side communication unit 217 is in a communication disabled state, the lens control unit 203 and the first lens-side communication unit 217 output an H (high) level signal through the eighth lens connector terminal LP8. In other words, the signal level at the signal line RDY is set to H. Until the signal line RDY holding H level shifts to L level, the body control unit 103 and the first body-side communication unit 117 do not start communication. They do not execute the next phase of processing for any communication in progress, either.

Upon verifying that the signal level at the signal line RDY is L (low) level, the body control unit 103 and the first body-side communication unit 117 output a clock signal 401 through the third body connector terminal BP3. Namely, the clock signal 401 is transmitted to the first lens-side communication unit 217 through the signal line CLK. In synchronization with the clock signal 401, the body control unit 103 and the first body-side communication unit 117 output a body-side command packet signal 402, which constitutes the first half of control data, via the fourth body connector terminal BP4. Namely, the body-side command packet signal 402 is transmitted to the first lens-side communication unit 217 via the signal line BDAT.

In addition, in synchronization with the clock signal 401 output to the signal line CLK, the lens control unit 203 and the first lens-side communication unit 217 output a lens-side command packet signal 403, which constitutes the first half of response data, via the fifth lens connector terminal LP5. Namely, the lens-side command packet signal 403 is transmitted to the first body-side communication unit 117 via the signal line LDAT.

Upon completion of the transmission of the lens-side command packet signal 403, the lens control unit 203 and the first lens-side communication unit 217 set the signal level at the signal line RDY to H (T2). The lens control unit 203 then starts first control processing 404 (which will be described later) corresponding to the contents of the body-side command packet signal 402 having been received.

Upon completing the first control processing 404, the lens control unit 203 notifies the first lens-side communication unit 217 of the completion of the first control processing 404. In response to this notification, the first lens-side communication unit 217 outputs an L-level signal via the eighth lens connector terminal LP8. In other words, the signal level at the signal line RDY is set to L (T3). In response to the signal level shift, the body control unit 103 and the first body-side communication unit 117 output a clock signal 405 through the third body connector terminal BP3. Namely, the clock signal 405 is transmitted to the first lens-side communication unit 217 via the signal line CLK.

In synchronization with the clock signal 405, the body control unit 103 and the first body-side communication unit 117 output a body-side data packet signal 406, which constitutes the second half of the control data, via the fourth body connector terminal BP4. Namely, the body-side data packet signal 406 is transmitted to the first lens-side communication unit 217 via the signal line BDAT.

In addition, in synchronization with the clock signal 405 output to the signal line CLK, the lens control unit 203 and the first lens-side communication unit 217 output a lens-side data packet signal 407, which constitutes the second half of the response data, via the fifth lens connector terminal LP5. Namely, the lens-side data packet signal 407 is transmitted to the first body-side communication unit 117 via the signal line LDAT.

Upon completion of the transmission of the lens-side data packet signal 407, the lens control unit 203 and the first lens-side communication unit 217 set the signal level at the signal line RDY to H again (T4). The lens control unit 203 then starts second control processing 408 (which will be described later) corresponding to the contents of the body-side data packet signal 406 having been received.

The first control processing 404 and the second control processing 408 executed by the lens control unit 203 are described next.

The body-side command packet signal 402 having been received may be a request for specific data available on the exchangeable lens side. In such a case, the lens control unit 203 analyzes the contents of the command packet signal 402 and generates the requested specific data through the first control processing 404. Furthermore, as part of the first control processing 404, the lens control unit 203 executes abridged communication error check processing based upon the number of data bytes so as to determine whether or not there has been any error in the communication of the command packet signal 402 by using checksum data contained in the command packet signal 402. A signal carrying the specific data generated through the first control processing 404 is output as the lens-side data packet signal 407 to the body side. It is to be noted that the body-side data packet signal 406 output from the body side following the initial output of the command packet signal 402 in this situation is a dummy data signal (still containing checksum data) which does not carry any significance to the lens side. Under these circumstances, the lens control unit 203 executes communication error check processing, such as that described above, by using the checksum data contained in the body-side data packet signal 406 as the second control processing 408.

In another scenario, the body-side command packet signal 402 may be a drive instruction for driving a lens-side drive target member. For instance, the command packet signal 402 may be a drive instruction for the focusing lens 210b and the body-side data packet signal 406 may indicate a drive quantity, i.e., the extent to which the focusing lens 210b needs to be driven. In this case, the lens control unit 203 analyzes the contents of the command packet signal 402 and generates an OK signal acknowledging that the contents have been understood in the first control processing 404. Furthermore, as part of the first control processing 404, the lens control unit 203 executes communication error check processing as described above by using the checksum data carried in the command packet signal 402. The OK signal generated through the first control processing 404 is then output to the body side as the lens-side data packet signal 407. In addition, the lens control unit 203 analyzes the contents of the body-side data packet signal 406 and executes communication error check processing, such as that described above, by using the checksum data contained in the body-side data packet signal 406 in the second control processing 408.

Upon completing the second control processing 408, the lens control unit 203 notifies the first lens-side communication unit 217 of the completion of the second control processing 408. By issuing this notification, the lens control unit 203 prompts the first lens-side communication unit 217 to output an L-level signal through the eighth lens connector terminal LP8. Namely, the signal level at the signal line RDY is set to L (T5).

It is to be noted that if the body-side command packet signal 402 is an instruction for driving a lens-side drive target member (e.g., the focusing lens) as described above, the lens control unit 203 engages the lens drive unit 212 in execution of processing through which the focusing lens 210b is driven by the extent matching the drive quantity, while sustaining the signal level at the signal line RDY at L level via the first lens-side communication unit 217.

The communication carried out from the time point T1 through the time point T5 as described above constitutes a single command data communication session. Through the single session of command data communication executed as described above, one body-side command packet signal 402 and one body-side data packet signal 406 are transmitted by the body control unit 103 and the first body-side communication unit 117. Namely, while the processing requires two separate packet signals to be transmitted, the two separate packet signals, i.e., the body-side command packet signal 402 and the body-side data packet signal 406, together constitute a set of control data.

Likewise, one lens-side command packet signal 403 and one lens-side data packet signal 407 are transmitted by the lens control unit 203 and the first lens-side communication unit 217 through the single session of command data communication. Namely, the two separate packet signals, i.e., the lens-side command packet signal 403 and the lens-side data packet signal 407, together constitute a set of response data.

As described above, the lens control unit 203 and the first lens-side communication unit 217 receive the control data from the first body-side communication unit 117 and concurrently transmit the response data to the first body-side communication unit 117. The eighth lens connector terminal LP8 and the eighth body connector terminal BP8 used for command data communication are contact points via which an asynchronous signal (a signal indicating H (high) level or L (low) level read at the signal line RDY) that is not synchronous with any clock signal is transmitted.

(Description of Hotline Communication)

The lens control unit 203 transmits lens position data to the second body-side communication unit 118 via the ninth lens connector terminal LP9, the tenth lens connector terminal LP10, the sixth lens connector terminal LP6 and the seventh lens connector terminal LP7, i.e., via the signal lines HREQ, HANS, HCLK and HDAT, by controlling the second lens-side communication unit 218. The following is a detailed description of the communication carried out by the second lens-side communication unit 218 and the second body-side communication unit 118.

It is to be noted that in the description of the embodiment, the communication carried out by the second lens-side communication unit 218 and the second body-side communication unit 118, respectively under control executed by the lens control unit 203 and the body control unit 103, will be referred to as "hotline communication".

Figure 8A:
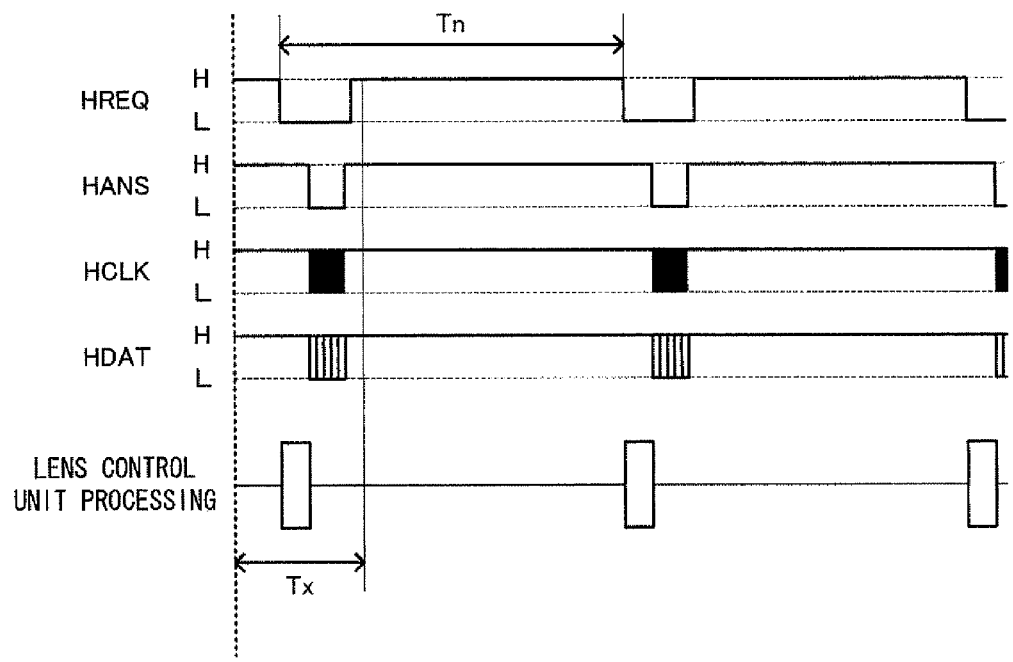
FIGS. 8A and 8B are timing charts indicating the timing with which hotline communication may be executed.
Figure 8B:
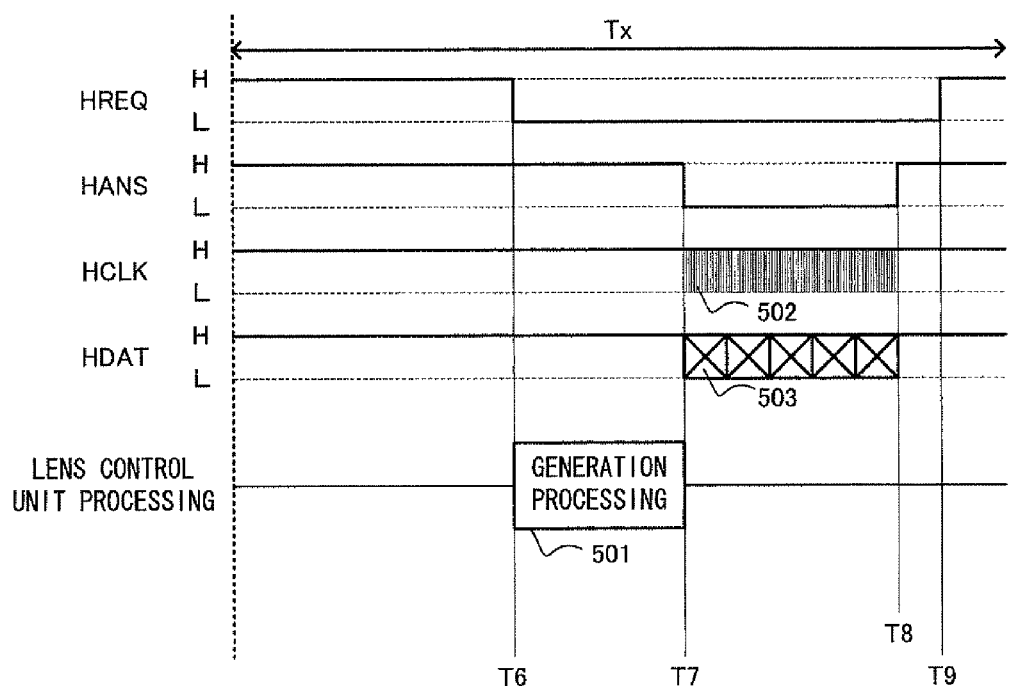

FIGS. 8A and 8B are timing charts indicating the timing with which hotline communication may be executed. The body control unit 103 in the embodiment adopts a structure that allows it to start hotline communication over predetermined second cycles (1 ms cycles in the embodiment). These cycles are shorter than the cycles over which command data communication is executed. FIG. 8A indicates that hotline communication is repeatedly executed over predetermined cycles Tn. FIG. 8B is an enlarged view of a given communication period Tx elapsing as hotline communication is repeatedly executed. The following is a description of the procedure through which hotline communication is carried out, given in reference to the timing chart in FIG. 8B.

The body control unit 103 and the second body-side communication unit 118 first output an L-level signal through the ninth body connector terminal BP9 at a hotline communication start (T6). In other words, the signal level at the signal line HREQ is set to L. The second lens-side communication unit 218 notifies the lens control unit 203 that the signal has been input to the ninth lens connector terminal LP9. In response to this notification, the lens control unit 203 starts executing data generation processing 501 in order to generate lens position data. In the generation processing 501, the lens control unit 203 engages the lens position detection unit 213 in detection of the position of the focusing lens 210b and generates lens position data indicating the detection results.

Once the lens control unit 203 completes execution of the generation processing 501, the lens control unit 203 and the second lens-side communication unit 218 output an L-level signal through the tenth lens connector terminal LP10 (T7). In other words, the signal level at the signal line HANS is set to L. In response to input of this signal at the tenth body connector terminal BP10, the body control unit 103 and the second body-side communication unit 118 output a clock signal 502 via the sixth body connector terminal BP6. Namely, the clock signal is transmitted to the second lens-side communication unit 218 via the signal line HCLK.

In synchronization with the clock signal 502, the lens control unit 203 and the second lens-side communication unit 218 output a lens position data signal 503 carrying the lens position data through the seventh lens connector terminal LP7. In other words, the lens position data signal 503 is transmitted to the second body-side communication unit 118 via the signal line HDAT.

Upon completing the transmission of the lens position data signal 503, the lens control unit 203 and the second lens-side communication unit 218 output an H-level signal through the tenth lens connector terminal LP10. In other words, the signal level at the signal line HANS is set to H (T8). In response to input of this signal at the tenth body connector terminal BP10, the second body-side communication unit 118 outputs an H-level signal through the ninth body connector terminal BP9. In other words, the signal level at the signal line HREQ is set to H (T9).

The communication carried out from the time point T6 through the time point T9 as described above constitutes a single hotline communication session. Through the single session of hotline communication executed as described above, a single lens position data signal 503 is transmitted by the lens control unit 203 and the second lens-side communication unit 218. The ninth lens connector terminal LP9, the tenth lens connector terminal LP10, the ninth body connector terminal BP9 and the tenth body connector terminal BP10 used in hotline communication are contact points via which asynchronous signals that are not synchronous with any clock signal are transmitted. In other words, the ninth lens connector terminal LP9 and the ninth body connector terminal BP9 are contact points via which an asynchronous signal (indicating H (high) level or L (low) level read at the signal line HREQ) is transmitted, whereas the tenth lens connector terminal LP10 and the tenth body connector terminal BP10 are terminals via which an asynchronous signal (indicating H (high) level or L (low) level read at the signal line HANS) is transmitted.

It is to be noted that command data communication and hotline communication may be executed simultaneously or they may be executed partially concurrently. This means that even while one of the communication units, i.e., either the first lens-side communication unit 217 or the second lens-side communication unit 218, is engaged in communication with the camera body 100, the other communication unit is also allowed to communicate with the camera body 100.

The camera system achieved in the first embodiment as described above realizes the following advantages.

(1) Among the twelve lens connector terminals LP1 through LP12 (their exposed areas) disposed in the holding portion 202, the twelfth lens connector terminal LP12 includes a portion LPA. The twelfth lens connector terminal LP12 is formed by ensuring that the interior angle formed by its contact area and the portion LPA, which is not a contact area, at the mount center point O is greater than the interior angle formed by the contact area of the twelfth lens connector terminal LP12 and the contact area of the third lens connector terminal LP3 at the mount center point O. In addition, the twelfth lens connector terminal LP12 is disposed at such a position that the portion LPA comes into contact with at least one body connector terminal among the twelve body connector terminals BP1 through BP12 when the camera body 100 is being mounted at the camera lens mount unit 201. Through these measures, a specific positional pattern is formed at the mount surface, which allows the individual terminals to be visually identified with ease. In addition, with the portion LPA of the twelfth lens connector terminal LP12 coming into contact with a body connector terminal, the exchangeable lens can be mounted more smoothly. Furthermore, since the twelfth lens connector terminal LP12 takes up a greater area, a more stable ground potential is assured, which, in turn, makes it possible to minimize the adverse effect of electrical noise on the power supply.

(2) The portion LPA of the twelfth lens connector terminal LP12 assumes a height relative to the surface of the holding portion 202, measured along the vertical direction, which is substantially equal to the height of the contact areas of the remaining lens connector terminals. As a result, the exchangeable lens 200 can be mounted at the camera body 100 more smoothly.

Second Embodiment

The camera system achieved in the second embodiment of the present invention, having a configuration similar to that of the camera system in the first embodiment, includes lens connector terminals with their exposed areas assuming a profile different from the profile of the exposed areas of the lens connector terminals in the first embodiment. The following is a description of the profile of the lens connector terminals at their exposed areas as achieved in the second embodiment. It is to be noted that in the following description, the same reference numerals are assigned to components similar to those of the first embodiment so as to preclude the necessity for a repeated explanation thereof. In addition, it is assumed that the camera body is identical to that in the first embodiment.

Figure 10A:
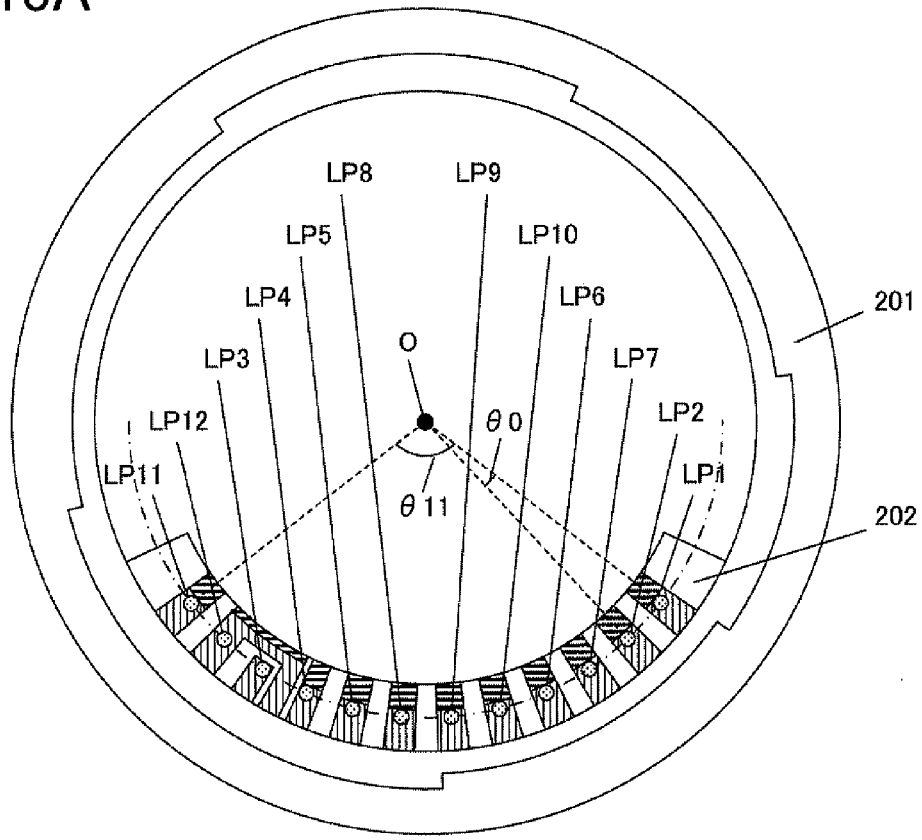
FIGS. 10A and 10B are front views of a holding portion achieved in a second embodiment.
Figure 10B:
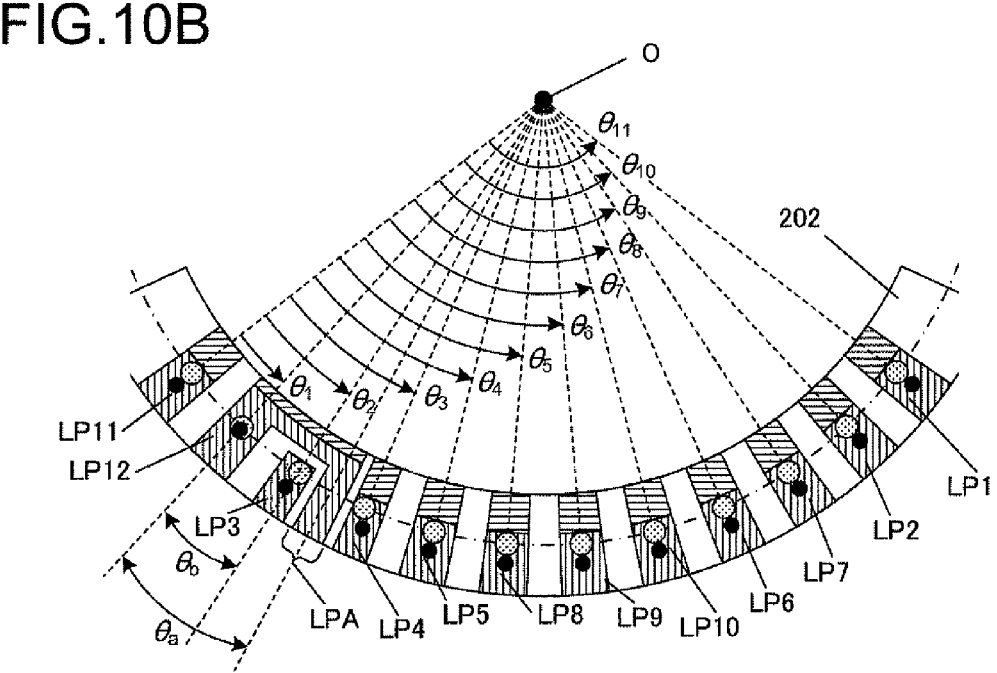

FIGS. 10A and 10B show the holding portion 202 achieved in the second embodiment in front views. As FIGS. 10A and 10B indicate, eleven lens connector terminals, excluding the third lens connector terminal LP3, among the twelve lens connector terminals LP1 through LP12 disposed in the holding portion 202 at the camera lens mount unit 201 in the embodiment, each assume a size large enough to range from the upper side (the side closer to the mount center point O) of the holding portion 202 through the lower side (the side further away from the mount center point O) of the holding portion 202. However, the size of their exposed areas and the positions of the exposed areas are the same as those of the lens connector terminals in the first embodiment described in reference to FIGS. 5A and 5B. The following is a description of features unique to the second embodiment, given in reference to a sectional view of the eighth lens connector terminal LP8.

Figure 11A:
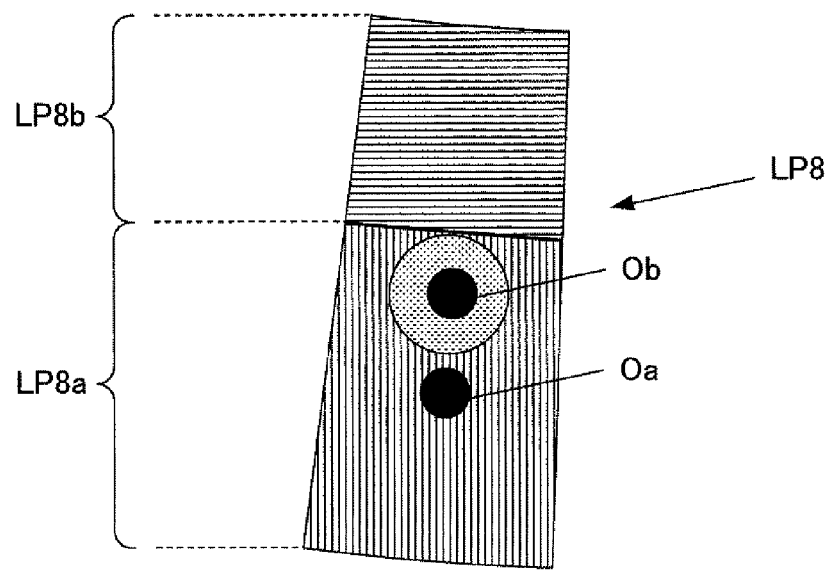
FIGS. 11A and 11B respectively provide a front view and a sectional view of the eighth lens connector terminal achieved in the second embodiment.
Figure 11B:
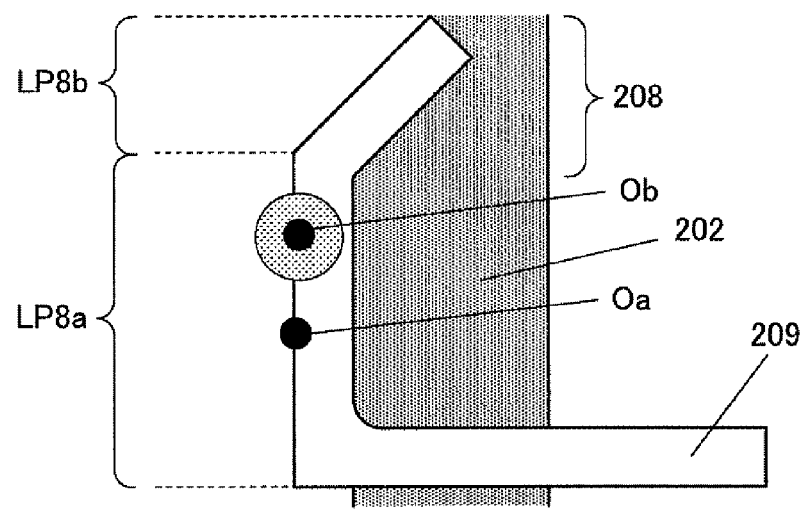

FIG. 11A is an enlarged front view of the eighth lens connector terminal LP8, whereas FIG. 11B shows the eighth lens connector terminal LP8 and the holding portion 202 in a sectional view. As shown in the sectional view presented in FIG. 11B, one end of a metal piece 209 constituting the eighth lens connector terminal LP8 is placed in a recess 208 formed at the surface of the holding portion 202. Namely, the surface of the metal piece 209 includes two different areas, i.e., an exposed area LP8a, which is exposed at the surface of the holding portion 202, and a fixing part LP8b at which the metal piece 209 is fixed to the holding portion 202. While the exposed area, viewed from the surface as in FIG. 11A, appears to be larger than those shown in FIGS. 5A and 5B, the size of the exposed area LP8a is actually the same as that of the exposed areas in FIGS. 5A and 5B. Accordingly, the central portion of the eighth lens connector terminal LP8 is the central portion Oa of the exposed area but not the central portion Ob of an area including the fixing part LP8b.

While a repeated explanation is not provided, the exposed areas of the remaining ten lens connector terminals in the embodiment are identical to the exposed area of the eighth lens connector terminal LP8 described above. Namely, the size of the exposed areas and the positions of the exposed areas of the remaining ten lens connector terminals are the same as those of the lens connector terminals shown in FIGS. 5A and 5B, and the area that would appear to have been added on at the surface is accounted for by the fixing part at which each metal piece is fixed to the holding portion 202. While an explanation is given above by assuming that the sizes and the positions of the exposed areas are the same as those in the first embodiment described in reference to FIGS. 5A and 5B, exposed areas may be formed to range over sizes and at positions different from those in the first embodiment.

The camera system achieved in the second embodiment as described above realizes advantages similar to those of the first embodiment.

The present invention allows for the following variations and one of the variations or a plurality of variations may be adopted in combination with either of the embodiments described above.

(Variation 1)

In the embodiments described above, the plurality of lens connector terminals are disposed along the lower edge of the holding portion 202, as illustrated in FIGS. 5A and 5B. However, the present invention is not limited to this example and the plurality of lens connector terminals may be disposed in the holding portion 202 by adopting a different positional arrangement. In addition, the plurality of lens connector terminals may be disposed at any positions within the holding portion 202 and the holding portion 202 may adopt any shape that may be different from the shape shown in FIGS. 5A and 5B.

(Variation 2)

The embodiments have been described by assuming that the position data indicating the position of the focusing lens 210b are transmitted from the exchangeable lens 200 to the camera body 100 through hotline communication. However, the present invention is not limited to this example and may be adopted in a system configured so as to transmit condition information pertaining to a drive target member other than the focusing lens through hotline communication. For instance, the present invention may be adopted in conjunction with an exchangeable lens 200 equipped with a blur correction lens, via which image blur attributable to unsteady handling during photographing operation is corrected. In such a case, position data indicating the position of the blur correction lens (X, Y position) may be transmitted through hotline communication. Furthermore, the present invention may be adopted in a system in which position information indicating the position of the aperture included in the exchangeable lens (information related to the size of the aperture opening) is transmitted. Moreover, in conjunction with an exchangeable lens 200 that includes a zoom lens, information related to the focal length of the lens may be transmitted through hotline communication. Under such circumstances, the generation processing 501 in FIG. 8B will include processing for generating blur correction lens position data, processing for generating aperture control position data pertaining to the aperture used to form the aperture opening (position information corresponding to the opening size), or processing for generating zoom lens position data.

(Variation 3)

The holding portion 102 (on the body side) and the holding portion 202 (on the lens side) are each manufactured as an integrated component (single component) in the embodiments described earlier. However, the present invention is not limited to this example and it may be adopted in conjunction with holding portions 102 and 202 each constituted with a plurality of separate holding portion parts, with one part corresponding to a specific number of terminals, which are put together as a single assembly.

(Variation 4)

While the camera system described in reference to the embodiments includes separate communication interfaces in correspondence to two different types of communication (hotline communication and command data communication), the present invention may be adopted in conjunction with an integrated communication interface. Namely, the first lens-side communication unit 217 and the second lens-side communication unit 218 on the exchangeable lens side may be integrated into a single communication unit. Likewise, the first body-side communication unit 117 and the second body-side communication unit 118 on the camera body side may be integrated into a single communication unit. Furthermore, a body control unit and a lens control unit with built-in functions enabling them to fulfill the functions of the corresponding communication interfaces, instead of the body control unit 103 and the lens control unit 203, may be utilized.

(Variation 5)

In the embodiments described earlier, the twelfth lens connector terminal LP12 alone adopts a shape different from that of the remaining lens connector terminals (part of the twelfth lens connector terminal ranges between two other lens connector terminals). Such an alternative shape may be adopted in another lens connector terminal as well. For instance, the second lens connector terminal LP2 may be formed in a shape identical to that of the twelfth lens connector terminal LP12 shown in FIGS. 5A and 5B. In addition, two or more lens connector terminals may adopt the alternative shape, or a single lens connector terminal may adopt the alternative shape. The second lens connector terminal LP2, adopting the alternative shape according to the present invention, assures stability in the ground potential, as does the twelfth lens connector terminal LP12 adopting the alternative shape.

In the embodiments described above, the part LPA of the twelfth lens connector terminal LP12 (its exposed area) is extended in between the third lens connector terminal LP3 and the fourth lens connector terminal LP4. In other words, the twelfth lens connector terminal LP12 (its exposed area) is arranged so as to surround the third lens connector LP3. However, the present invention is not limited to the configuration, and the part LPA of the twelfth lens connector terminal LP12 (its exposed area) may be arranged to extend in between the fourth lens connector terminal LP4 and the fifth lens connector terminal LP5. Namely, the twelfth lens connector terminal LP12 (its exposed area) may be arranged to surround the third lens connector terminal LP3 and the fourth lens connector terminal LP4, and also, it may be arranged to surround another lens connector terminal. The similar arrangement may be applied in cases where an exposed area adopts a shape different from others so that a part of the exposed area extends between other lens connector terminals.

Moreover, a given lens connector terminal may adopt a shape different from that described in reference to the first embodiment. For instance, the twelfth lens connector terminal LP12 may be formed so as to surround another lens connector terminal, as illustrated in FIG. 9. As a further alternative, the twelfth lens connector terminal LP12 may include parts ranging between all the other lens connector terminals. It is to be noted that when a lens connector terminal is disposed so as to "surround another lens connector terminal", the lens connector terminal may range in a square shape or a U shape so as to completely surround the other lens connector terminal, or it may range in, for instance, an L shape so as to only partially surround the other lens connector terminal.

(Variation 6)

The lens connector terminals in the embodiments described earlier are formed so that all the lens connector terminals achieve heights substantially equal to one another over the surface of the holding portion 202. As an alternative, some lens connector terminals may be formed so as to assume a height different from that of the remaining lens connector terminals. For instance, the twelfth lens connector terminal LP12 and the third lens connector terminal LP3 may assume equal heights, different from the height of the remaining lens connector terminals.

The embodiments described above each allow the individual terminals at the exchangeable lens to be visually identified with ease.

As long as the features characterizing the present invention are not compromised, the present invention is not limited to the particulars of the embodiments described above and other modes that are conceivable within the technical scope of the present invention are also within the scope of the invention.

For instance, either of the embodiments may be adopted in conjunction with any of the variations described above.

What is claimed is:

1. An exchangeable lens, comprising:
a camera lens mount unit having a mount center point, to which a camera body, with twelve body connector terminals disposed near a camera body mount unit at the camera body, is attached;
a holding portion where twelve lens connector terminals, each connected to one of the twelve body connector terminals and each including a contact area to come into contact with one of the body connector terminals, are disposed;
an optical system that includes a drive target member which can be driven; and
a drive unit that drives the drive target member, wherein:
the twelve lens connector terminals are:
a first lens connector terminal through which a drive voltage to be used to engage the drive unit in operation is provided from the camera body;
a second lens connector terminal that functions as a ground terminal corresponding to the drive voltage;
a third lens connector terminal through which a first clock signal from the camera body is input;
a fourth lens connector terminal through which a first data signal from the camera body is input in synchronization with the first clock signal;
a fifth lens connector terminal through which a second data signal is output to the camera body in synchronization with the first clock signal;
a sixth lens connector terminal through which a second clock signal from the camera body is input;
a seventh lens connector terminal through which a third data signal is output to the camera body in synchronization with the second clock signal;
an eighth lens connector terminal through which a first asynchronous signal that is not synchronous with the first clock signal or the second clock signal is output to the camera body;
a ninth lens connector terminal through which a second asynchronous signal that is not synchronous with the first clock signal or the second clock signal is input from the camera body;
a tenth lens connector terminal through which a third asynchronous signal that is not synchronous with the first clock signal or the second clock signal is output to the camera body;
an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and
a twelfth lens connector terminal that functions as a ground terminal corresponding to the operating voltage;

an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;
an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;
an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;
an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;
an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;
an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;
an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;
an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;

an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a shape of at least one lens connector terminal among the twelve lens connector terminals is different from a shape of another lens connector terminal among the twelve lens connector terminals.

2. An exchangeable lens according to claim 1, wherein:
the at least one lens connector terminal among the twelve lens connector terminals adopts a shape formed relative to the mount center point different from the shape of another lens connector terminal among the twelve lens connector terminals relative to the mount center point.

3. An exchangeable lens according to claim 2, wherein:
an interior angle formed at the mount center point representing a width of the at least one lens connector terminal among the twelve lens connector terminals, is different from an interior angle formed at the mount center point representing an width of the other lens connector terminal.

4. An exchangeable lens according to claim 1, wherein:
the one lens connector terminal is disposed so as to surround a lens connector terminal other than the one lens connector terminal, among the twelve lens connector terminals.

5. An exchangeable lens according to claim 1, wherein:
the one lens connector terminal adopts a square shape.

6. An exchangeable lens according to claim 1, wherein:
the one lens connector terminal adopts a U shape.

7. An exchangeable lens according to claim 1, wherein:
the one lens connector terminal adopts an L shape.

8. An exchangeable lens, comprising:
a camera lens mount unit having a mount center point, to which a camera body, with twelve body connector terminals disposed near a camera body mount unit at the camera body, is attached;

a holding portion where twelve lens connector terminals, each connected to one of the twelve body connector terminals and each including a contact area to come into contact with one of the body connector terminals, are disposed;

an optical system that includes a drive target member which can be driven; and a drive unit that drives the drive target member, wherein:
the twelve lens connector terminals, each including an exposed area exposed at a surface of the holding portion, are:
a first lens connector terminal through which a drive voltage to be used to engage the drive unit in operation is provided from the camera body;
a second lens connector terminal that functions as a ground terminal corresponding to the drive voltage;
a third lens connector terminal through which a first clock signal from the camera body is input;
a fourth lens connector terminal through which a first data signal from the camera body is input in synchronization with the first clock signal;
a fifth lens connector terminal through which a second data signal is output to the camera body in synchronization with the first clock signal;
a sixth lens connector terminal through which a second clock signal from the camera body is input;
a seventh lens connector terminal through which a third data signal is output to the camera body in synchronization with the second clock signal;
an eighth lens connector terminal through which a first asynchronous signal that is not synchronous with the first clock signal or the second clock signal is output to the camera body;
a ninth lens connector terminal through which a second asynchronous signal that is not synchronous with the first clock signal or the second clock signal is input from the camera body;
a tenth lens connector terminal through which a third asynchronous signal that is not synchronous with the first clock signal or the second clock signal is output to the camera body;
an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and
a twelfth lens connector terminal that functions as a ground terminal corresponding to the operating voltage;

an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;

an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;

an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;

an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;

an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;

an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a shape of an exposed area of at least one lens connector terminal among the twelve lens connector terminals is different from a shape of an exposed area of another lens connector terminals.

9. An exchangeable lens according to claim 8, wherein:
the exposed area of the at least one lens connector terminal among the twelve lens connector terminals adopts a shape formed relative to the mount center point different from a shape of the exposed area of the other lens connector terminal among the twelve lens connector terminals relative to the mount center point.

10. An exchangeable lens according to claim 9, wherein:
an interior angle formed at the mount center point representing a width of the exposed area of the at least one lens connector terminal among the twelve lens connector terminals, is different from an interior angle formed at the mount center point representing a width of the exposed area of the other lens connector terminal.

11. An exchangeable lens according to claim 8, wherein:
the exposed area of the one lens connector terminal is disposed so as to surround the exposed area of the other lens connector terminal among the twelve lens connector terminals.

12. An exchangeable lens according to claim 8, wherein:
the exposed area of the one lens connector terminal adopts a square shape.

13. An exchangeable lens according to claim 8, wherein:
the exposed area of the one lens connector terminal adopts a U shape.

14. An exchangeable lens according to claim 8, wherein:
the exposed area of the one lens connector terminal adopts an L shape.

15. An exchangeable lens according to claim 1, wherein:
the one lens connector terminal is either the second lens connector terminal or the twelfth lens connector terminal.

16. An exchangeable lens, comprising:
a camera lens mount unit having a mount center point, to which a camera body, with twelve body connector terminals disposed in a circular arc pattern near a camera body mount unit at the camera body, is attached;
a holding portion where twelve lens connector terminals, each connected to one of the twelve body connector terminals when engaged with the camera body and each provided with an exposed area exposed at a surface including a contact area to come into contact with a corresponding one of the body connector terminals, are disposed;
an optical system that includes a drive target member which can be driven; and
a drive unit that drives the drive target member, wherein:
the twelve lens connector terminals are:

a first lens connector terminal through which a drive voltage to be used to engage the drive unit in operation is provided from the camera body;

a second lens connector terminal that functions as a ground terminal corresponding to the drive voltage;

a third lens connector terminal through which a first clock signal from the camera body is input;

a fourth lens connector terminal through which a first data signal from the camera body is input in synchronization with the first clock signal;

a fifth lens connector terminal through which a second data signal is output to the camera body in synchronization with the first clock signal;

a sixth lens connector terminal through which a second clock signal from the camera body is input;

a seventh lens connector terminal through which a third data signal is output to the camera body in synchronization with the second clock signal;

an eighth lens connector terminal through which a first asynchronous signal that is not synchronous with the first clock signal or the second clock signal is output to the camera body;

a ninth lens connector terminal through which a second asynchronous signal that is not synchronous with the first clock signal or the second clock signal is input from the camera body;

a tenth lens connector terminal through which a third asynchronous signal that is not synchronous with the first clock signal or the second clock signal is output to the camera body;

an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage;

an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;

an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;

an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;

an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;

an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;
an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and
the exposed area of at least one lens connector terminal among the twelve lens connector terminals includes an area other than the contact area in addition to the contact area, the area other than the contact area extends between any two lens connector terminals adjacent to one another in a circumferential direction among other lens connector terminals, and an interior angle formed by the contact area and the area other than the contact area in the exposed area of the one lens connector terminal at the mount center point is greater than an interior angle formed by the contact area of a lens connector terminal disposed closest to the one lens connector terminal and the contact area of the one lens connector terminal at the mount center point.

17. An exchangeable lens according to claim 16, wherein:
an interior angle formed at the mount center point representing a width of the at least one lens connector terminal among the twelve lens connector terminals in the circumferential direction, is different from an interior angle formed at the mount center point representing an width of another lens connector terminal in the circumferential direction.

18. An exchangeable lens according to claim 16, wherein:
the one lens connector terminal is disposed so that the contact area and the area other than the contact area of the exposed area of the one lens connector terminal surround a lens connector terminal other than the one lens connector terminal, among the twelve lens connector terminals.

19. An exchangeable lens according to claim 16, wherein:
a shape formed by the contact area and the area other than the contact area of the exposed area of the one lens connector terminal is a square shape.

20. An exchangeable lens according to claim 16, wherein:
a shape formed by the contact area and the area other than the contact area of the exposed area of the one lens connector terminal is a U shape.

21. An exchangeable lens according to claim 16, wherein:
a shape formed by the contact area and the area other than the contact area of the exposed area of the one lens connector terminal is an L shape.

22. An exchangeable lens according to claim 16, wherein:
the one lens connector terminal is either the second lens connector terminal or the twelfth lens connector terminal.

* * * * *